United States Patent
McCoy

(10) Patent No.: US 8,896,139 B2
(45) Date of Patent: Nov. 25, 2014

(54) META-MASS VIBRATION ENERGY HARVESTER

(71) Applicant: John J. McCoy, Washington, DC (US)

(72) Inventor: John J. McCoy, Washington, DC (US)

( * ) Notice: Subject to any disclaimer, the term of this patent is extended or adjusted under 35 U.S.C. 154(b) by 0 days.

(21) Appl. No.: 13/986,445

(22) Filed: May 3, 2013

(65) Prior Publication Data

US 2014/0319844 A1    Oct. 30, 2014

Related U.S. Application Data

(63) Continuation of application No. 12/926,157, filed on Oct. 28, 2010, now abandoned.

(60) Provisional application No. 61/272,753, filed on Oct. 29, 2009.

(51) Int. Cl.
*F03D 5/04* (2006.01)
*F03G 7/08* (2006.01)

(52) U.S. Cl.
CPC ..................... *F03G 7/08* (2013.01)
USPC ........................................................ 290/1 R

(58) Field of Classification Search
USPC ................... 290/1 R; 310/309, 339
See application file for complete search history.

(56) References Cited

U.S. PATENT DOCUMENTS

| | | | |
|---|---|---|---|
| 7,345,372 B2 * | 3/2008 | Roberts et al. | 290/1 R |
| 7,557,456 B2 * | 7/2009 | Kornbluh et al. | 290/42 |
| 7,999,402 B2 * | 8/2011 | Freeland et al. | 290/1 R |
| 2007/0007770 A1 * | 1/2007 | Jager et al. | 290/1 R |

* cited by examiner

*Primary Examiner* — Tho D Ta

(57) ABSTRACT

A meta-material vibration energy harvester includes a housing element encapsulating a multiplicity of oscillators capable of harvesting a significant percentage of the total mechanical energy diffusely distributed throughout the vibrating structure, the harvester design resulting in a rapid transfer of mechanical energy entering it via the housing element from the element to the oscillators wherein the energy remains trapped while accumulating over an extended time, the percentage of energy transfer primarily depending on the ratios of the sum of the oscillator masses to the sum of the housing mass and of the measure of the mass of the vibrating structure and of the width of the band spanned by the oscillators to its center frequency, both the relevant measure of the vibrating structure mass and the values of the mass and frequency ratios that maximize the percentage of internal energy transfer depending on the harvesting scenario.

7 Claims, 15 Drawing Sheets

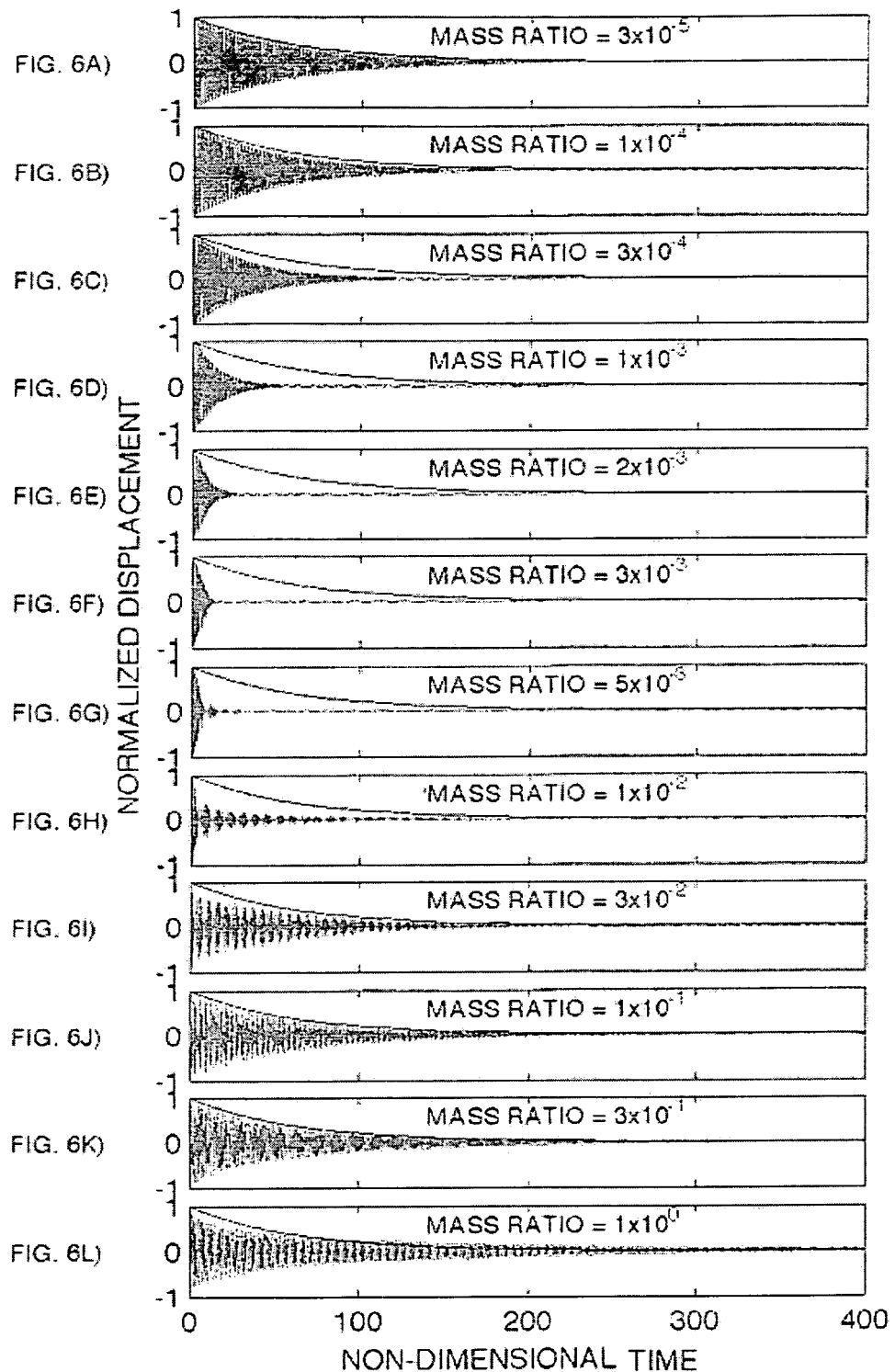
PRIOR ART

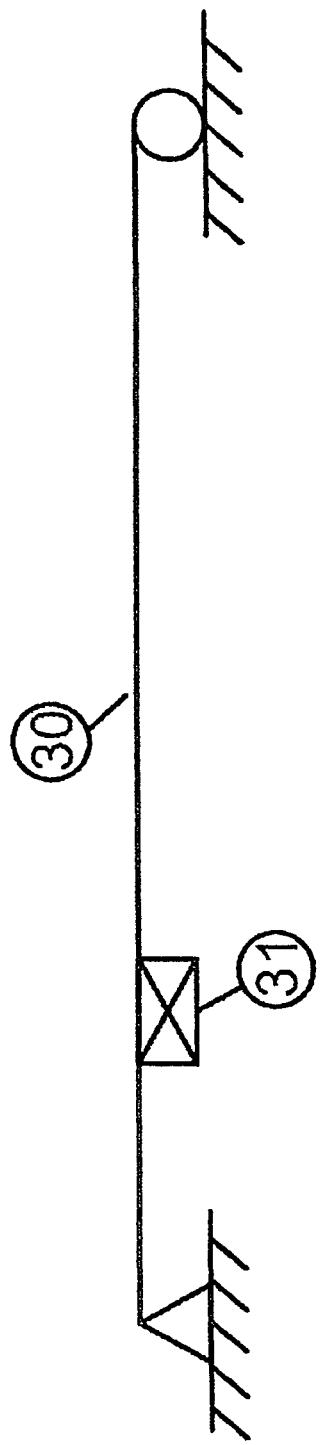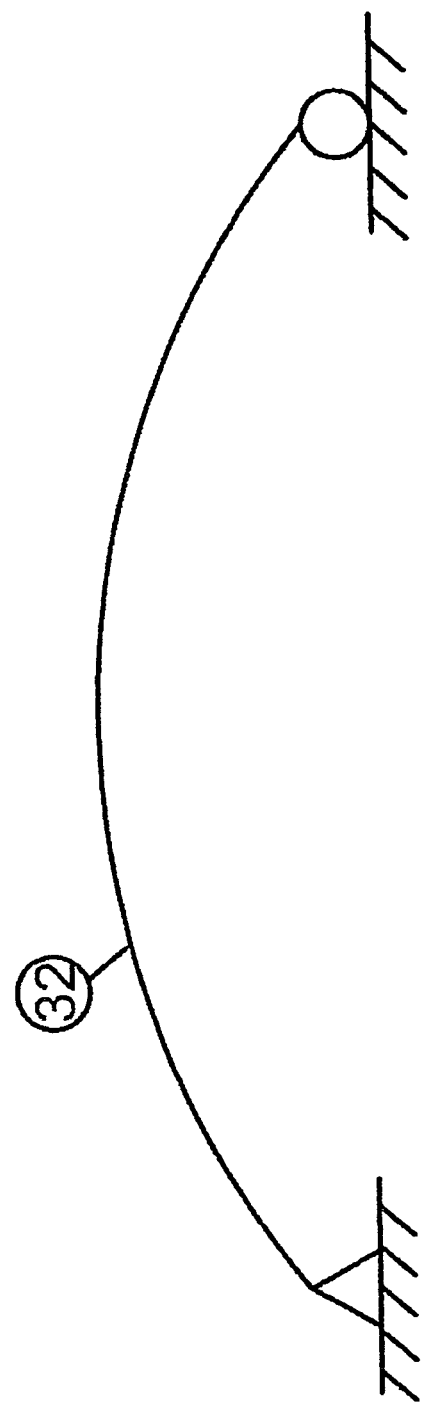

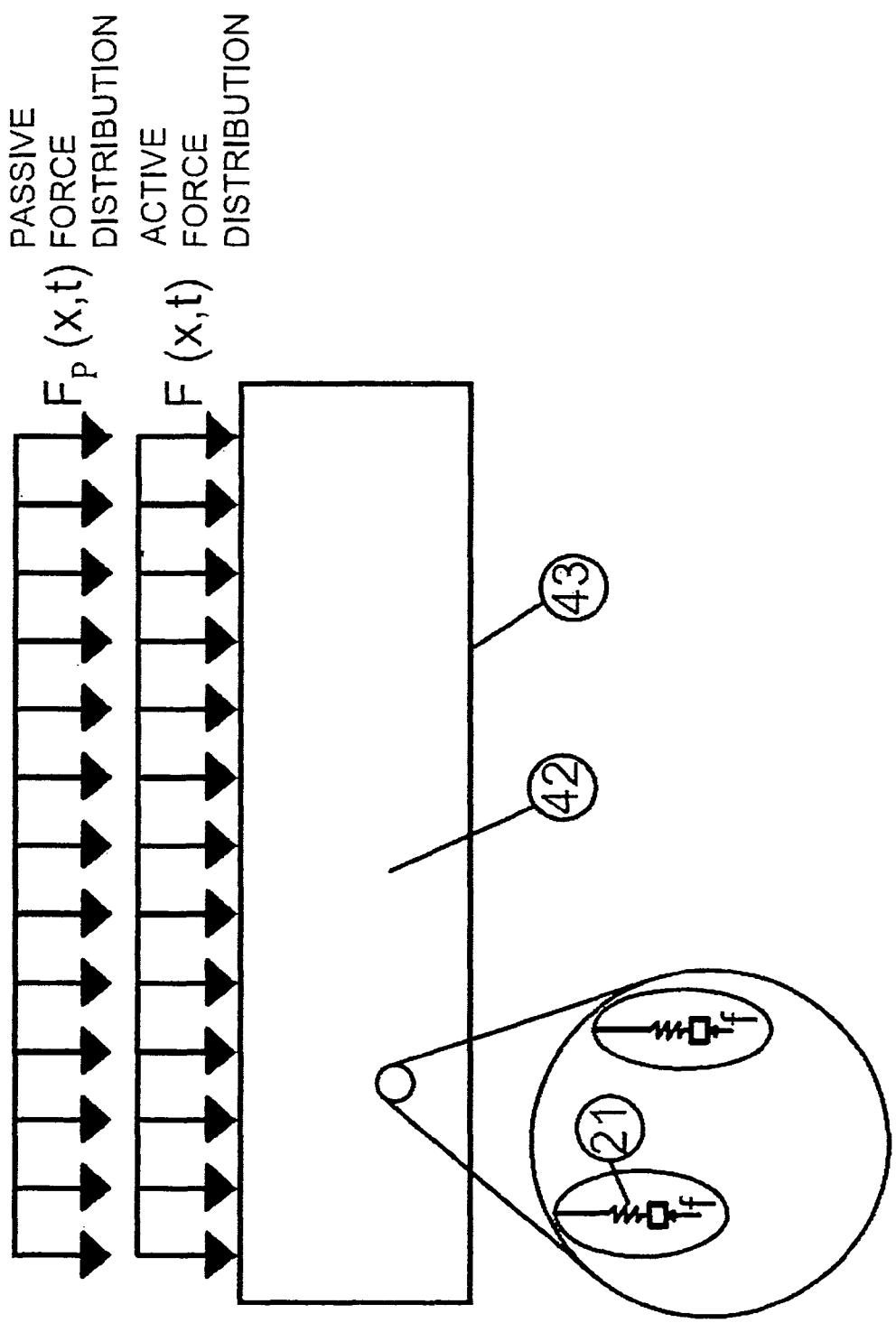

META-MASS VIBRATION ENERGY HARVESTER

CROSS-REFERENCE TO RELATED APPLICATIONS

This application is a continuation of U.S. patent application Ser. No. 12/926,157, filed Oct. 28, 2010 and Provisional Application Ser. No. 61/272,753, filed Oct. 29, 2009, the priority of which is hereby claimed.

FIELD OF THE INVENTION

The invention relates to a vibration energy harvester comprised of a large number of oscillators encapsulated in a housing element, combined with mechanical/electrical energy converters, one for each oscillator, and the internal circuitry for collecting the individual electric currents and outputting their total, via the housing element. The invention is applicable to virtually all structures and vibration fields. Moreover, when used in multiplicity, the invention is capable of harvesting a significant percentage of the total available energy in a vibrating structure.

BACKGROUND OF THE INVENTION

In search of the solution to the world energy crisis, researchers and industry have focused their efforts on harnessing energy from alternative energy sources, most notably the sun, wind, and ocean waves.

Technologies for harvesting energy from these sources are in their infancy, though significant progress has been made. However, the efficiency of existing technologies is limited, and resulting environmental issues, such as noise and microclimate change, have become increasingly problematic. Unless these technologies can be dramatically improved, their energy harvesting potential will be limited. High governmental priority has been assigned to improving these technologies. The focus so far has been to engineer more efficient devices (e.g. blades and turbines) that convert wind and surface wave energy into electricity and to improve solar panel design.

Little attention is being paid to harnessing the vibration energy that is created by natural dynamic environmental processes and by manmade processes, both of which represent vast pools of renewable mechanical energy. Natural dynamic environmental processes (wind, ocean waves, subsurface ocean currents, tectonic movement) cause the vibration of structures with which they come into contact. Vibration is also created in almost all manmade processes. It results from all forms of transport, in the vehicles themselves, and from vehicular contact with roads, bridges, train tracks and other infrastructure. Technologies for harvesting these alternative power sources are in their infancies. Vibration energy harvesters (VEH) are a logical way to convert this vibration and convert it to electrical energy.

The state-of-the-art of VEH, as measured by patent applications and awards, are limited to micro-electro-mechanical systems (MEMS) that are only capable of generating very small amounts of power measures in the order of milliwatts. The development of a technology based on a VEH that is capable of harvesting a measurable percentage of the total energy in vibrating structures (VS) deserves attention. Accepting the possibility of such a device, its development would allow for harvesting a substantial percentage of the total energy is VS, using a system comprising a moderate number of devices integrated with and distributed throughout the VS. Such a system would harness the vast mechanical energy pools created in the natural world by first converting the energy as vibration in structures designed for this purpose. One advantage of this novel approach is that the integration of the VEH as part of the VS isolates all moving parts from the potentially hostile environment that is the source of vibration. Structures can be designed to capture the mechanical energy in subsurface ocean currents and in deep ocean internal waves. Another advantage this novel approach is that the coherence of the source of mechanical energy being tapped need not be as great as that required by a wind turbine, for example. Structures can be designed to capture energy from atmospheric turbulence.

The invention comprises a VEH capable of harvesting a measurable percentage of the total energy in vibrating structures.

The use of vibration energy harvesters (VEH) comprised of multiple oscillators attached to a base that is in turn attached to a vibrating structure (VS), is known in the art. The use of vibration dampers (VD) comprised of multiple oscillators encapsulated in a housing element that is in turn attached to a VS, is also known in the art. Accepting that the base/housing-element is rigid, its motion does not depend on the locations of the oscillators; the geometric distinction is, therefore, irrelevant.

The invention is distinguished over the existing arts by the different objectives, numbers of oscillators, and the relative massiveness of the devices. For example, VEH typically have a small to moderate number of oscillators; say, less than 10, which VD of the type related to the invention typically have a much larger number; say, greater than several 100's, even 1000's. Another distinction is known VEH have vastly smaller sizes and masses; U.S. Pat. No. 6,858,970 B2, for example, describes a MEMS harvester with mass- and size-ratios, relative to those of the VS, that approach infinitesimals. By contrast, effective VD have mass- and size-ratios, relative to those of the VS, which while still small relative to 1, are finite.

Because of their small mass, known VEH are severely limited in the quantities of energy harvested, typically measured at the level of milliwatts; U.S. Pat. No. 6,858,970 B2 is representative of the art of VEH. At the milliwatt level, the total quantity of energy harvested in any reasonable time is a vanishing percentage of the energy available in the VS. The principal application of currently known VEH is to power micro-sized sensors and computers, with an understanding that the rate of energy extraction from the VS is too small to have an effect on the vibration field in the structure. The design of the MEMS energy harvester is consistent with these applications.

Rescaling the mass of an available VEH can result in a comparable rescaling of the quantity of energy harvested, but only if the more massive device initiates an energy transfer within the VS, drawing energy from locations remote from that of the device, to the device. Without this energy transfer, only the energy in the immediate neighborhood of the device, a percentage of the total energy available that approaches an infinitesimal, is available of harvesting. Significantly, the initiation of the energy transport process requires certain quantifiable design criteria, not known to the present art, be met. The invention includes the identification of these criteria, expressed by a limited number of device parameters, and a design framework for determining the values that result in an effective device.

Mechanical devices for damping the vibrations of a structure are designed to either change the dynamics of the structure, thereby precluding the introduction of energy, or to dissipate the energy as heat. Damping devices based on a large number of oscillators encapsulated in a housing element are in the latter category. Typically, the mass of an efficient VD is a large enough percentage of that of the VS to negatively impact design criteria for the VS not related to the VD. Pub No: US 2009/0078519 A1 describes a class of VD that accomplishes the damping by a much less massive device than heretofore known. The design according to this known device results in the rapid transfer of a significant percentage of the energy drawn into the device, to the internal oscillators wherein it "remains trapped indefinitely," using the terminology in the reference. The indefinite trapping of energy in the oscillators largely eliminates the need for internal "energy dissipaters" that add mass to the device. The design requires that the oscillator resonances densely fill a frequency band according to a formularization, i.e. a prescribed dependence of the values of the resonant frequencies relative to one another. The dense filling requirement is expressed by a minimum number of oscillators, which is also determined by a formularization. Both formularizations are essential to this known device.

While the present invention is presented as a vibration energy harvester, the observation that a significant quantity of the available energy is removed from the VS suggests it also has a role as a VD. In this role, the invention is distinguished from the class described in Pub. No: US 2009/0078519 A1 by the active removal of energy transferred to and entrapped within the internal oscillators, by converting it to electricity. Thus, the "near irreversibility" of the vibration damper described in Pub. No: US 2009/0078519 A1 is made "absolute" in the case of the present invention, by the removal of the energy transferred to the interior oscillators, as electricity. This active removal of energy fundamentally changes the device design and fabrication, by eliminating the need for the formularization that determines precise values for the oscillator resonances relative to each other. Eliminating this formulation eliminates a major complexity in the fabrication of the present device.

SUMMARY OF THE INVENTION

The present invention is a device, described as a "meta-material vibration energy harvester" (MMVEH), which when attached to a VS has the capacity to harvest a "reasonable" percentage of the energy in a spatially diffuse vibration field contained therein, by drawing energy from throughout the VS, to and into the device, wherein it is converted from mechanical to electrical. Further according to the invention are its efficacy for a virtually inexhaustible range of VS, for virtually all vibration fields, and for a broad range of attachments of the MMVEH and the VS. The criterion for "reasonable," in describing the percentage of energy harvested, is that a small multiplicity of MMVEH; less than a modest multiple of 10, say; distributed across the VS has the capacity of harvesting a significant percentage of the total energy in the vibration field.

For purpose of this invention, a meta-material is a manmade material comprised of a large number of mini-structures encapsulated within a naturally occurring material, also described as a housing element, which has properties that are not found in naturally occurring materials. The encapsulation of the internal mini-structures is understood to preclude both their direct observation, by mechanical means, and their interaction with an external environment. The interaction obtains indirectly through their interaction with the housing material that, in turn, interacts with the external environment. Their presence is also observed indirectly, in the changes these cause in the interaction of the housing material and the external environment. The usefulness of the concept of meta-materials is the possibility of designing a manmade material to behave differently from any material found in nature.

The invention is a "device" comprising a meta-material that extracts mechanical energy from a VS via a housing element and outputs electrical energy via said housing element, for which the designed behavior is an enhanced "energetics," as measured by the quantity of mechanical energy extracted and the percentage of the inputted mechanical energy that is outputted as electrical energy. The enhanced energetics is occasioned by the operation of the device over time, whereby the mechanical energy drawn into the housing element is rapidly transferred to the internal oscillators, where the energy accumulates and is ultimately converted and outputted via the housing element, as an electric current. The mechanical behavior of the invention, which does not obtain for a housing element comprising any material found in nature but no internal oscillators, is the device acting both as a one-way mechanical valve, allowing the energy to enter but not exit, and a mechanical battery, whereby the accumulating energy is stored.

In one manifestation of the invention, the housing element is rigid and the internal structures are single degree-of-freedom oscillators combined with mechanical/electrical converters. FIG. 1) shows a schematic of the mechanical elements of a more particular manifestation of the invention for which housing element[20] has a single degree-of-freedom, represented by a translation coordinate, and each of the internal oscillators also have a single degree-of-freedom, and, therefore are represented, mathematically, as sprung masses[21]. The forces shown acting on the internal oscillator masses represent the converter elements. The negative work accomplished by these forces in slowing the oscillator masses quantifies the energy converted from mechanical to electrical.

For the manifestation in which the housing element is rigid, the designation of the mechanical aspect as a meta-mass" may be more descriptive than "meta-material." The term meta-material is retained since the invention contemplates other manifestations for which the housing element is deformable and for which the internal oscillators have multiple degrees-of-freedom. Also included among these other manifestations are those for which the internal oscillators are not mechanical; the internal structures can be fabricated as mechanical/electrical converters joined with oscillating electrical circuits.

The design of a specific MMVEH is expressed in the values of the multiplicity of physical parameters that describe, mechanically, the housing element; the internal oscillators; and, the mechanical effects of the mechanical/electrical converters. Given the behavior of the housing element depends on the external environment, i.e., the VS and the vibration field contained therein, as well as the internal oscillators, an effective MMVEH design depends on the geometry and composition of the VS and the description of the vibration field contained therein. There is no universal design that can be put forth as describing the invention. The specifics of the design will differ for VS comprised of structural elements having one, two, and three dimensions and systems comprised of such elements, and for vibration fields having differing measures of spatial coherence. Further according to the invention is that a multiplicity of MMVEH, each of which is effective for a moderate band of frequencies, forms a system capable of harvesting the energy in a vibration field that has broad spectral content. Still further, according to the invention is a virtually inexhaustible range of ways for attaching the MMVEH and VS, including both linear and nonlinear attachments, as occasioned for example via an elastic element that behaves linearly or nonlinearly. A nonlinear attachment would result in across-frequency transfer of energy to accompany its transfer from the VS to the housing element, which can be exploited in choosing the internal mechanical/electrical energy conversion.

The spatial coherence of the energy containing vibration field warrants attention since the invention is intended for a fully coherent field, an example of which is the low frequency vibration of a beam caused by a spatially localized force; a fully incoherent field, an example of which is a higher frequency vibration in a track caused by a passing train; and, fields that are partially coherent, an example may be a moderate frequency vibration in a bridge component caused by automobile traffic. It is known in the art that appropriate mathematical models that govern the evolutions of vibration fields depend on the spatial coherence of the field, with models based on the classical vibration theories appropriate for fully coherent fields whereas models based on statistical theories, e.g., "statistical energy analysis" (SEA), are appropriate for fully incoherent fields. The invention contemplates application for all vibration fields, requiring only that the specifics of the MMVEH design accommodate the spatial coherence of the field.

The range of harvesting scenarios for which the invention is applicable presents a challenge to its detailed description, beginning in the next section. In closing this summary description, it is noteworthy to observe that available VEH neither exploit nor require a design that results in enhanced energetics. The quantity of energy harvested by available VEH, measured relative to that in the VS, is so small as to make irrelevant, issues of the rates of transfer of energy between the VS and the VEH.

BRIEF DESCRIPTION OF THE DRAWINGS

FIGS. 6A to 6L show the results of simulations for the motion history of the base mass for the model shown in FIG. 5 for a range of experiment scenarios;

FIG. 7 shows a schematic of a simply supported beam to which a meta-material mechanical energy harvester (MMVEH) is attached at a "point" location along the beam;

FIG. 8 shows a schematic of the lowest order vibration mode for a simply supported beam;

FIG. 21 shows a schematic of a deformable meta-material mechanical/electrical energy converter, for which the housing element is a beam, or a plate.

A DETAILED DESCRIPTION OF THE INVENTION

The novelty of the concept of meta-material devices, as described in the summary description, and the paucity of studies reported in the literature, which directly apply to the invention necessitates a highly technical detailed description. The description is presented in stages, focusing first on the energetics of a "mechanical" meta-material (MMM) device that forms the genesis of the invention, and, second, on the energetics of a "meta-material mechanical/electrical energy converter" (MMMEEC) in the context of an experiment scenario that has a direct relation to energy harvesting. When joined to a VS, which is the source of input energy to the MMMEEC, the device is a MMVEH. Issues related to the geometry and composition of the VS and to the coherence of the vibration field and the role of these in determining an effective MMVEH design are addressed at this point in the detailed description.

Additional sections in the detailed description describe different type attachments of the MMVEH to the VS; deformable MMVEH; and, the conversion of mechanical energy to an electrical current.

The Mechanics of a Meta-Material Device

Figure 1:
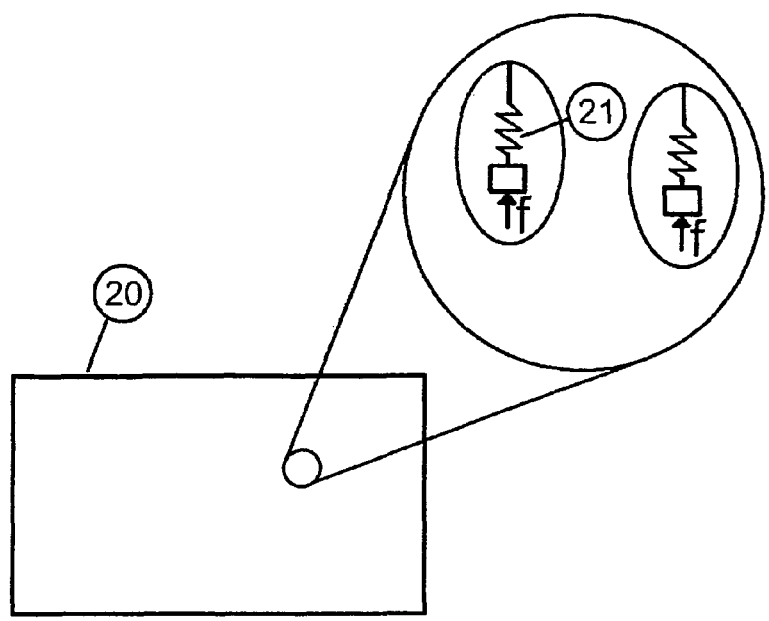
FIG. 1 shows an illustration of a meta-material mechanical energy converter (MMMEEC), comprising a housing element encapsulating a large number of internal oscillators to each of which is connected to a mechanical/electrical converter element, represented by a force.
Figure 2:
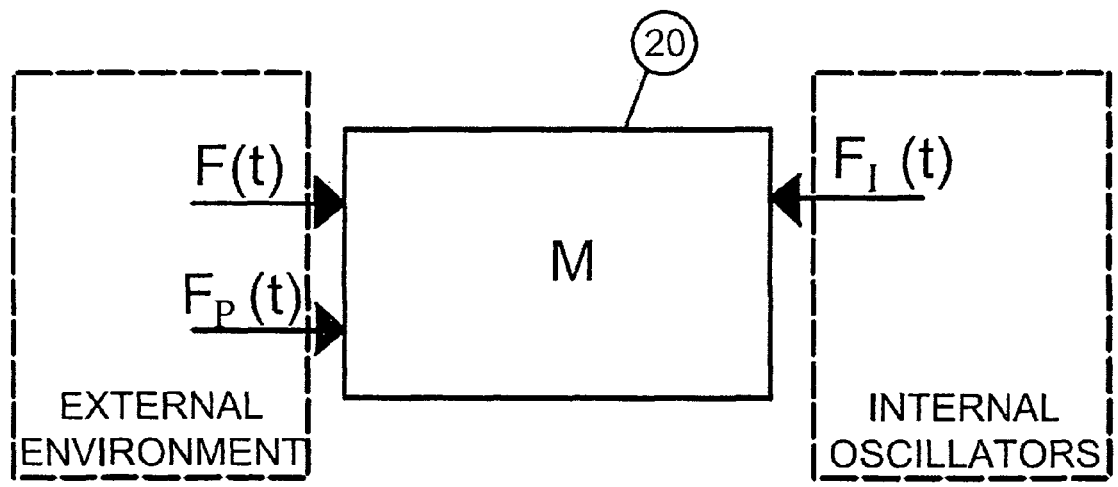
FIG. 2 shows a graphical representation of a generic mathematical model governing the motion of the rigid housing element of a mechanical meta-material.

The effects of both the external environment and of the internal oscillators on the motion history of the housing element[20] are represented by forces, as illustrated in FIG. 2. The force representing the effects of the external environment has two components, in general: an "active" component, denoted by F(t), which is the cause of the housing element motion; and, a "passive," or "reactive," component, denoted by $F_p(t)$, which develops in response to the housing element motion. (An example of an external reactive force would be that due to an elastic element grounding the housing element.) With broad generality, the passive component can be represented by an operator, denoted by $K_{vs}$, which maps the housing element motion history, denoted by x(t), to $F_p(t)$; one writes a formal "operator" equation, $F_p(t)=K_{vs}x(t)$. Given a specific harvesting scenario, the active force history, F(t), and a representation for the operator, $K_{vs}$ can be determined by pre-calculation. The "net internal force" that represents the effects of the internal oscillators, denoted by $F_I(t)$ in the illustration, is passive; it develops in response to the housing element motion. There are multiple ways one can represent $F_I(t)$, which are equivalent if not equivalently convenient; the convenience depends somewhat on the experiment scenario. The issue of the representation of $F_I(t)$ is addressed in the context of illustrative experimental scenarios.

The Energetics of an Ungrounded Mechanical Meta-Material

Figure 3:
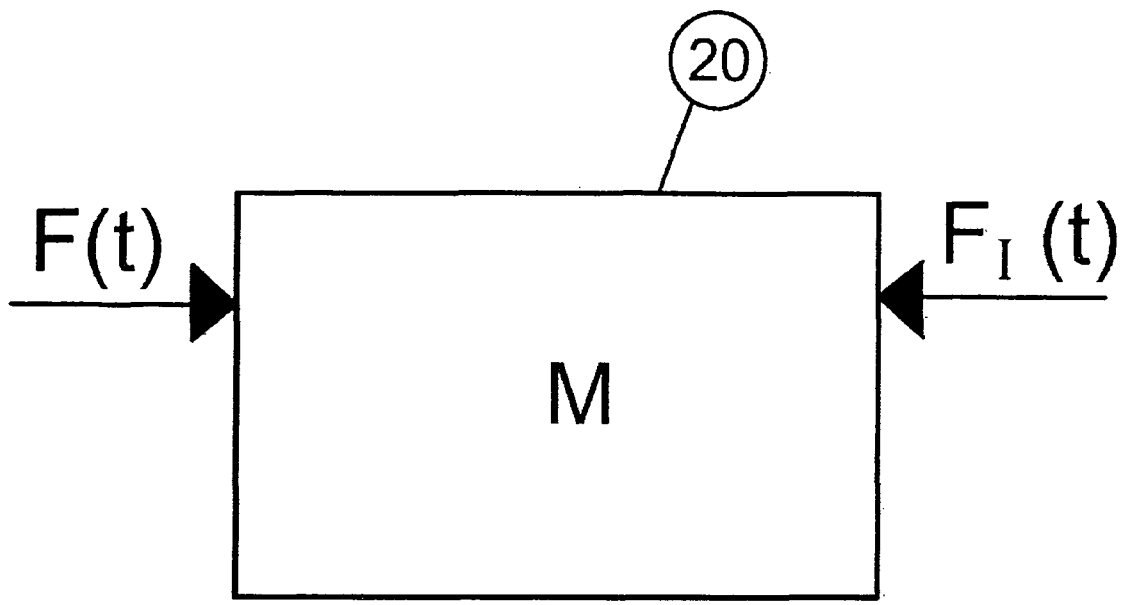
FIG. 3 shows a graphical representation of a mathematical model governing the motion of the rigid housing element of an ungrounded mechanical meta-material.

Consider an experimental scenario in which the force representing the external environment has only an active component, i.e. the housing element is ungrounded, and for which there are no mechanical/electrical energy converters, i.e. the meta-material is purely mechanical. The experiment, which does not represent a realistic harvesting scenario, is a useful prelude for investigating the energetics of any "mechanical meta-material" (MMM) device, and for identifying the global design parameters that result in enhanced energetics. The elimination of the mechanical/electrical converters results in an "energy conserving" meta-material; this is necessary for constructing a mathematically rigorous, analytical framework for quantifying the device energetics. The experimental scenario is schematically illustrated in FIG. 3 in which the multiple internal oscillators are represented by a single, net internal force, $F_I(t)$.

It is convenient to represent the net internal force $F_I$, by an operator, denoted by H*, which maps the external force, F(t), to an "effective" force, $F^*(t)=F(t)-F_I(t)$; i.e., $F^*(t)=H^*F(t)$. The designation of the force $F^*(t)$ as "effective" reflects an understanding that the motion of the housing element of the meta-material forced by F(t), is the same as is the motion of the housing element comprised of a naturally occurring material, a rigid mass in this case, with no internal oscillators, when forced by it.

The construction of a spectral, i.e., frequency, space representation of the H* is a straight-forward exercise for a practitioner knowledgeable of vibration theory. The result is written, $$H*(w) = \frac{1}{(1 + \sum_{j}^{N} \frac{m_j \ddot{\omega}_j^2}{(\omega_j^2 - \omega^2)})} = \frac{\prod_{j}^{N}(\omega_j^2 - \omega^2)}{\prod_{j}^{N}(\omega(j)^2 - \omega^2)} \quad (1)$$

where ω denotes the frequency coordinate; the $w_j$ denote the resonant frequencies of the N internal oscillators; and the $\overline{m}_j$ denote the ratio of masses of the oscillators to the housing element mass M. The $\omega^{(j)}$ in the second expression on the right-hand-side are the N roots of the denominator polynomial, i.e., are solutions of the equation obtained on setting the denominator in the first expression equal to zero. The $w^{(j)}$ are the N, non-zero resonant frequencies of the ungrounded MMM as a dynamical system; that the MMM is ungrounded implies that, as a dynamical system, it also has a resonant frequency equal to 0.

It is easily concluded from the first expression for the denominator polynomial that the $w^{(j)}$ and $w_j$ are intertwined, with the N−1, smallest $\omega^{(j)}$ locating points on the real frequency line that are each within one of the N−1 intervals described by the $\omega^j$. For a scenario for which the $\omega^j$ "densely" fill a frequency band of width, Ω, then, these N−1, $\omega^{(j)}$ also densely fill the band. Only the largest of the $\omega^{(j)}$, locates a point outside the band. Further, referring to the second expression for the operator representation, each of the interior "poles" of its spectral space representation can be paired with a corresponding "zero;" the one nearest to it; with the frequency difference between each paired pole and zero decreasing for increasing N, and fixed Ω.

A knowledgeable practitioner appreciates the operator H* has a temporal space representation as a convolution described by a time-series that is the Fourier inverse of its spectral space representation in Eq. (1). Without loss in either generality or mathematical rigor, one can write an expression for this time-series as a sum of four components, a delta function component that, when convolved with F(t) reproduces F(t), and three components that, when convolved with each other and with F(t) determine $F_I(t)$. The latter three components are two that are separately due to the N−1 interior poles and to the single outlier pole, and a third that is a convolution of the first two. The behavior that ultimately results in enhanced energetics is the contribution from the interior pole, represented by the time-series, $$H_I(t) = \sum_{j=1}^{N-1} r_j \Delta \sin(\omega^{(j)} t), \quad (2)$$

where the $\bar{r}_j$ are the values of "residues," one for each of the $\omega^{(j)}$ poles, normalized using the frequency interval locating the pole, i.e., $\Delta_j$. Because of the normalization, the $\bar{r}_j$, are all pure numbers that, subject to the dense filling requirement, have values between 0 and a number approximately equal to 1.

Determining the precise values of the $\bar{r}_j$ requires detailed descriptions of the sets of $\omega_d$ and $m_j$ values, and numerical calculations. For understanding the enhanced energetics of the ungrounded MMM, however, one does not require precise values of the $\bar{r}_j$, all one requires is a conclusion that the variation across the set will be slow, which is valid provided the $\omega_j$ are more-or-less evenly distributed across the frequency band and the $m_j$ are more-or-less equal. The mild restrictions on the values of the $\omega^{(j)}$ and the corresponding $\bar{r}_j$ significantly constrain the variation in the time-series, an observation that can be demonstrated by additional analysis or numerical experimentation. Thus, the time-series admits of a "universal" description as an unending sequence of pulses with widths measured in units of $\Omega^{-1}$, separated by a time interval measured in units of $N\Omega^{-1}$. For N substantially large, then, the pulses are well separated and their effects can be considered separately. Noteworthy is an observation that a primary effect of introducing mechanical/electrical energy converters would be to eliminate the later-arriving pulses, leaving only that which begins at t=0.

The first pulse, removed from the later arriving pulses, has a spectral representation that is described by a dimensionless, positive real-valued function, $\bar{f}(\omega)$, a band-limited function of frequency, which has a graphical representation obtained by passing a smooth curve through the set of discrete residue values, $\bar{r}_j$. Assuming $\bar{r}(\omega)$ is more-or-less symmetrically distributed about $\omega_c$, the center frequency of the band spanned by the oscillators, the first pulse is described by $$A_I(t)\sin(\omega_c t),$$

where the amplitude modulation increases from a value of 0 at time t=0 reaching some maximum value before returning to a value near 0, all in a time interval of the order of $\Omega^{-1}$. Moreover, attached to the end of the pulse is an extended tail during which its magnitude decreases algebraically with increasing time; the genesis of the tail is the sharp change in $\bar{r}(\omega)$ values near the ends of the frequency band. The most significant "global" measure of $A_I(t)$ is its "strength," defined as the integral of its variation over unbounded time. Normalizing the measure of strength, it can be described by $<\bar{r}>\Omega|A_I|$, where $<\bar{r}>$ is the average of $\bar{r}(\omega)$ over the frequency band for which it is nonzero.

To appreciate the enhanced energetics of the ungrounded MMM, consider a specific time-varying force, $$F(t)=F_0\sin(\omega_c t).$$

For this external force history, the effective force history is, approximately, $$F^*(t) \approx F_0(\sin(\omega_c t) - \frac{1}{2}A_1(t)\cos(\omega_c t)),$$

where, once again, the approximation requires the fractional bandwidth $\Omega/\omega_c$ be substantially small.

The energetics is quantified by the rate at which the external force acting on the moving housing element accomplishes work; this equals the product of F(t) and v(t), the velocity history of the housing element, obtained on integrating F*(t). Integrating the first term obtains a contribution to v(t), $$(M\omega_c)^{-1}F_0(1-\cos(w_c t)),$$

where the harmonically varying component is 90° out-of-phase with harmonically varying component in the expression for F(t). Multiplying this contribution by F(t), obtains, $$(M\omega_c)^{-1}F_0^2(\sin(w_c t) - \frac{1}{2}\sin(2w_c t))$$

a sum of two terms, both of which vary harmonically in time. This expression implies there is no net kinetic energy introduced to the housing element over time; the kinetic energy introduced as positive work during certain time intervals is removed as negative work during other time intervals.

The net internal force, the second term in the expression for F*(t), results in a second contribution to v(t) that, again accepting the small fractional bandwidth approximation, equals $$(2M\omega_c)^{-1}F_0(\int_0^t A_I(t')dt')\sin(w_c t),$$

which has a harmonic component that is in-phase with the corresponding variation in F(t) expression. A consequence of this is the product of this contribution and F(t) contains a term, $$(4M\omega_c)^{-1}F_0^2\int_0^t A_I(t')dt',$$

which asymptotically approaches is constant, $$(4M\omega_c)^{-1}F_0^2\bar{r}\Omega|A_I|$$

The last expression describes what is a monotonically increasing energy inputted to the housing element of the ungrounded MMM. Significantly, the largest percentage of the inputted energy dues not remain as kinetic energy in the housing element but is transferred in a time measured in units of m−1, as vibration energy in the internal oscillators. This is easily demonstrated by an expression for the work accomplished by the net internal force acting on the moving housing element.

Introducing mechanical/electrical energy converters at the level of the internal oscillators and the necessary circuitry for collecting the internal electrical currents, changes the nature of the MMM; it would now be more properly described as a "meta-material mechanical-to-electrical converter" (MMMEC), recognizing the mechanical energy inputted to the housing element is outputted via the housing element as an electric current. Given the enhanced mechanical energy inputted to the device via the housing element and its rapid transfer to the encapsulated oscillators wherein it remains trapped while accumulating, awaiting conversion to electrical currents, the quantity of energy converted is substantially larger than would a combination of the housing element without the encapsulated oscillators, and an mechanical/electrical converter.

Removing mechanical energy at the level of the internal oscillators can be expected to effect the inputting of mechanical energy to the housing element and the subsequent transfer of this energy to the internal oscillators, but this effect is secondary to the effects described by the theoretical analysis. This last observation can be demonstrated by numerical analysis, presented in the context of an experiment scenario in which the MMM is grounded, in a subsequent section.

Lessons from the Theoretical Analysis that Apply to the Invention

The conclusions based on the theoretical analysis regarding the energetics of the meta-material are summarized as follows.

1. The transfer of energy from the housing element to the internal oscillators is measured in units of $\Omega^{-1}$, where $\Omega$ is the width of the band of oscillator resonances, and the time the transferred energy remains trapped in the oscillators is measured in units of $N\Omega^{-1}$, where N is the number of internal oscillators. These conclusions prove to be "universals," applicable for all harvesting scenarios and independent of all other physical measures describing the meta-material; the VS; and, the connection of the MMVEH to the VS.

2. There can be a significant percentage increase in the quantity of energy inputted to the meta-material by the action of a specified external force, provided the spectral content of the external force overlaps the frequency band spanned by the internal oscillators, i.e., that described by its center frequency, $\omega_r$, and $\Omega$. The increased energy inputted to the meta-material, via the housing element, is transferred from the housing element to the internal oscillators as described in the first conclusion. This second conclusion also proves to be a "universal," applicable for all harvesting scenarios.

3. The energy increase is quantified by a measure of the strength of a net internal force pulse. The value of the strength measure proves to depend on a multiplicity of physical parameters that describe the meta-material, primarily the sum of the masses of the internal oscillators $m_s$, and the mass of the of the housing element; the VS; and the connection of the MMVEH thereto. That is, the value of the strength measure is not a "universal," but depends on the harvesting scenario.

The Energetics of an Elastically Grounded MMM

Figure 4:
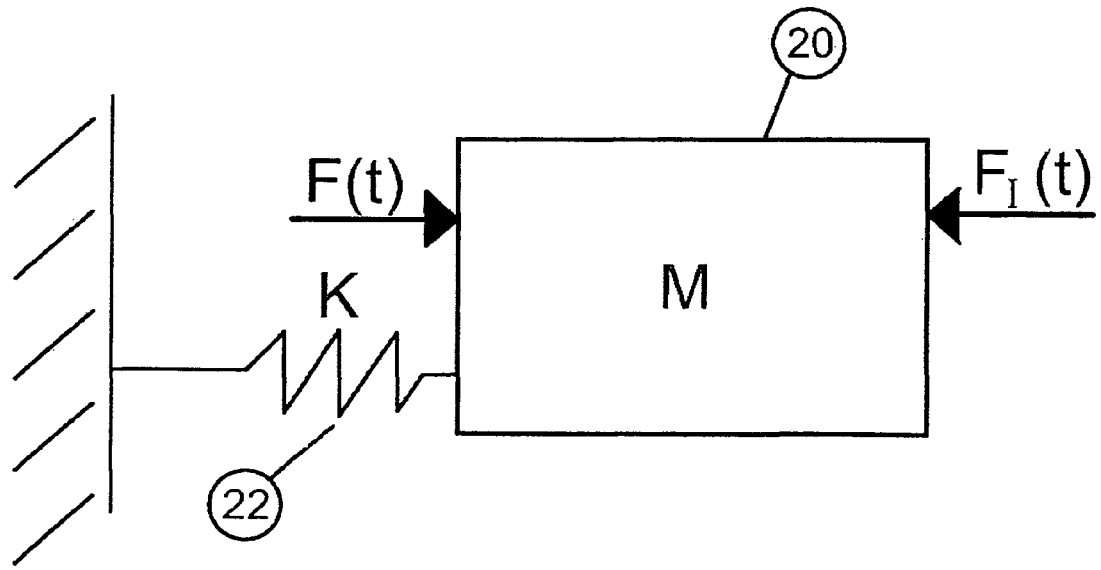
FIG. 4 shows a graphical representation of a mathematical model governing the motion of the rigid housing element of a mechanical meta-material grounded by an elastic element.

Consider an experiment scenario for which the MMM is grounded by a linearly elastic element[22] of stiffness K, the mathematical model governing the response of the housing element is schematically illustrated in FIG. 4. As for the ungrounded MMM, the internal oscillators are not shown in the illustration, only shown is the net internal force $F_I(t)$ these cause to act on the housing element in response to the action of the external force F(t).

The grounding of the MMM introduces an additional characteristic frequency to the geometry and composition of the dynamical system, the resonant frequency of the housing element with no internal oscillators, denoted by $\omega_0$. For the internal oscillators to have maximum effect on the energetics of the grounded MMM, the value of $\omega$, must be deep within the band spanned by the internal oscillator resonances; for specificity, let $\omega_0 = \omega_c$.

Neglecting, for a moment, the effects of the mechanical/electrical energy converters as secondary, the analysis described for the ungrounded MMM can be slightly generalized for the grounded MMM. The analysis is expressed in the description of an operator, H*, that maps an external force, F(t) to an effective force, F*(t), which now, significantly, acts on the grounded MMM. Referring to Eq. (1), describing the spectral space representation of the operator for the case of the ungrounded MMM, the only change for the grounded MMM are minor changes in the locations of the poles identified by Eq. (1) and the addition of one zero and pole, the additional pole described as an "outlier," since its value is less than the smallest of the resonances of the internal oscillators.

Referring to Eq. (2), describing the time-series that is the contribution of the interior poles to the convolution that represents H* in temporal space, the principal effects of the grounding are twofold, a sign change is the residue values for the $\omega^{(j)}$ that are smaller than $\omega_0$ and a different "rule" for determining the magnitude of the residues in terms of more primitive physical parameters that describe the dynamical system.

Neither change impacts the conclusions that were described as "universals;" the time-series continues to obtain as a sequence of pulses with widths measured in units of $\Omega^{-1}$ separated by a time interval measured in units of $N\Omega^{-1}$. The changes do impact the intra-pulse variations. Regarding the first pulse, the change in the sign of the residues in a variation described by $$A_I(t)\cos(w_0 t),$$

with a 90° phase shift in the harmonic component. The modulating amplitude pulse, like that for the ungrounded MMM, begins with a value of 0 at t=0, rising to a maximum and returning to a value near zero in a time measured in units of $\Omega^{-1}$, appended to which is an extended tail within which its magnitude decreases algebraically with increasing time. The extended tail for the scenario of a grounded MMM is due to a rapid change in the value of $\bar{r}(\omega)$, from negative to positive, in neighborhood of $\omega = \omega_0$. The most significant global measure of $A_I(t)$ is its strength defined as the integral of the variation over all time. Significantly, the grounding of the MMM impacts the pulse strength and the rule for determining the pulse strength in terms of more primitive physical parameters that describe the dynamical system.

It proves convenient for discussing the energetics of the grounded MMM, to convolve the first pulse with the temporal space representation of the impulse/response function for the grounded MMM housing element with no internal oscillators, i.e., $$(M\omega_0)^{-1}\sin(w_0 t).$$

Accepting the small fractional bandwidth $\Omega/\omega_c$ approximation introduced previously, the result of the convolution is $$-(2M\omega_0)^{-1}(\int_0^t A_I(t')dt')\sin(\omega_0 t).$$

which when combined with the impulse/response function of the grounded MMM housing element with no internal oscillators, results in a contribution to an "effective" impulse/response function.

$$(M\omega_0)^{-1}(1-2\int_0^t A_I(t')dt')\sin(\omega_0 t).$$

For times after that of the application of the impulse, t=0, that are large relative to $\Omega^{-1}$ but small relative to $N\Omega^{-1}$, this reduces to $$(M\omega_0)^{-1}(1-2<\bar{r}>\Omega|A_I|)\sin(\omega_0 t).$$

where $<\bar{r}>\Omega|A_I|$ is the first net internal force pulse measure.

The complexity of the grounded MMM as a dynamical system precludes an analytical formularization of a rule for determining the strength measure, $<\bar{r}>\Omega|A_I|$. Moreover, should the formularization be accomplished for a MMM with no mechanical/electrical energy converters and grounded by a simply spring, it would have little value as a tool for designing an effective MMVEH. Ultimately, the effects of removing mechanical energy from a MMM and the design of an effective MMM will require numerical experimentation. An illustration of the required experimentation is described in the next section.

A Validation and Extension of the Theoretical Analysis
Numerical Simulations

Figure 5:
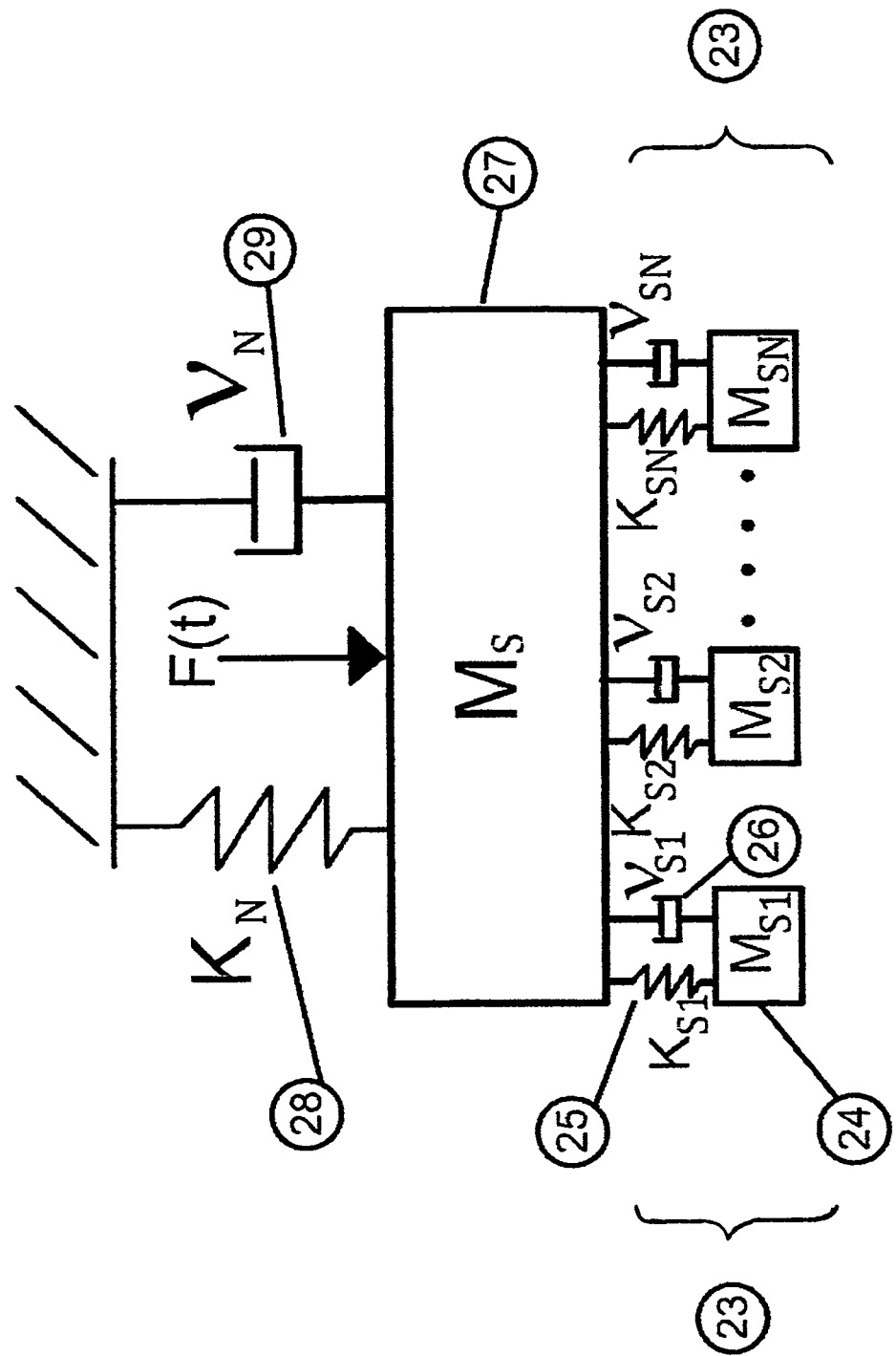
FIG. 5 shows a graphical representation of a mathematical model governing the response of a dynamical system comprising a rigid base mass grounded by an elastic element and a dashpot, to which a multiplicity of masses are each attached by a spring and a dashpot.

A validation of the theoretical analysis presented for the grounded MMM and an investigation of factors that cannot be included therein can be provided by numerical simulations. In lieu of accomplishing numerical simulations for the purpose of developing the invention, is made to numerical simulations accomplished by other authors for purposes other than the development of a vibration energy harvester. These simulations are reported in the peer reviewed research literature (Vignola et al. J. Acous. Soc. Am., vol. 126, pp 129-139, 2009). The mathematical model investigated is schematically illustrated in FIG. 5, taken from the referenced paper. As seen in FIG. 5) N oscillators[23], each having a mass[24] $m_s j$, are shown attached by a spring[25] with stiffness $k_s j$ and a dashpot[26] with strength $v_s j$, to a base mass[27] that is grounded by a springs[28] with stiffness $K_s$ and a dashpot[29] with strength $v_s$. As indicated previously, for a rigid housing element, the locations of the internal oscillators are irrelevant to the motion history of the element. The inclusion of the dashpots in the dynamical system for which the numerical simulations are accomplished allows for an investigation of the assertion that the removal of energy from the system, both at the level of the base mass and the attached oscillators, has only a secondary effect on the transfer of energy between the base mass and the oscillators.

The reported simulations are summarized by the graphs in FIG. 6A to FIG. 6L. For all simulations, N is 50; the ratio of the width of the frequency band spanned by the attached oscillator resonances to the center frequency of the band is ⅛; the center frequency band equals the resonant frequency of the grounded base mass in isolation; and, the strengths of the dashpots are equal. Varied across the set of simulations presented is the ratio of the sum of the internal oscillator masses, $\Sigma_j m_{sj}$ to that of the base Mass $M_s$. The variation across the sets of the oscillator masses and the resonant frequencies were chosen by a formularization that is not germane for the purposes here, except for an understanding that the masses $m_s$ are about equal and the distribution of the frequencies across the frequency band is substantially uniform.

The graphs in FIGS. 6A to 6L presenting the results of the simulations show the velocity histories of the base mass motion after the action of an impulsive force, and the amplitudes and phases of the spectral representations of the velocity histories, for different values of $\Sigma_j m_{sj}/M_s$. Referring to the time histories, the time coordinate is normalized using $\omega_c$, such that for a fractional bandwidth equaling ⅛, the width of the first pulse is nominally equal to normalized t=8, and with N=50, the arrival of the second pulse obtains are normalized t=400, the ending time from the graphs.

Starting with the topmost graph, FIG. 6A: For this the mass ratio, $\Sigma m_{sj}/M_s = 10^{-5}$, a value chosen to be so small as to result in the internal oscillators having no effect on the behavior of the housing mass. This is reflected in a housing mass velocity history having a time harmonic variation at the resonant frequency of the housing element in isolation, modulated by an exponentially decaying envelope, appropriate for the strength of the viscous damper grounding the mass element. The strength of the viscous damper is such that virtually all of the mechanical energy is removed from the system before what would be the arrival time of the second force pulse, t=400. The second and third of the topmost three graphs, FIG. 6B and FIG. 6C, show the amplitude and phase spectra defined on the time series; the three graphs are what one would expect.

Jumping down to the case for which the mass ratio, $\Sigma_j m_{sj}/m_s \approx 0.005$, it is clearly seen that the velocity of the housing element returns to zero in a normalized time approximately equal to 8, corresponding to $\Omega^{-1}$, remaining approximately equal to zero thereafter. For this case, which is close to optimum, the sum of the masses of the internal oscillators is approximately 0.5% of the magnitude of the base mass, a mass ratio that is surprisingly small for the internal oscillators to have such a profound effect on the base mass motion. Referring to the amplitude spectrum defined on the housing mass velocity, this is seen to be relatively flat over the frequency band. By association, it is for mass ratios approximately equal to 0.005 that the strength of the first net internal force pulse approximately equals 1.

For mass ratios smaller and larger than 0.005, one again sees that the velocity of the housing mass does not return to a value near zero for t≥8, approximately. These results, and others, are explained by the theoretical analysis. The net internal time-varying force for an impulsive external force of unit magnitude acting equals the time-space representation of the operator that maps any external time-varying force acting to the corresponding net internal force history. The work accomplished by this force in slowing the mass element gives quantitative measure to the energy transferred from the mass element to the internal oscillators. For mass ratios less than 0.005, the "strength" of the first force pulse is somewhat less than 1, the strength necessary to transfer the kinetic energy introduced to the mass element by the impulse force. For mass ratios somewhat greater than 0.005, the strength of the first pulse is somewhat greater than 1; the first force acts to remove the total kinetic energy introduced to the housing element "before" its conclusion. Significantly, the force pulse continues to act after all the energy has been transferred to the internal oscillators; the internal force develops to accomplish motion compatibility at the attachments of the internal springs to the mass element. This continuing action results in further mass element motion; the work accomplished by the continuing action of the force pulse on the moving mass element gives measure to a secondary energy transfer, by which energy is from the internal oscillators to the mass element. "Optimum" energy transfer and entrapment requires a design that results in transfer of energy from the housing element as the first pulse concludes; for the other conditions that describe the numerical simulations, this obtains when the total mass of the internal oscillators approximately equals 0.5% of $M_s$.

Among observations that are consistent with the theoretical analysis are the appearance to two peaks in the amplitude spectrum defined on the mass element velocity history. The peaks appear at the two ends of the frequency band spanned by the uncoupled oscillator resonances, for mass ratios slightly larger than 0.005, which become more pronounced and move further from the two ends with increasing mass ratio values. The genesis of this behavior in the outlier poles; the simulations show the contributions of these can be neglected for the smaller mass ratios for which optimum behavior obtains.

Not explained by the analytic expression for $F_f(t)$ that was obtained for an energy conserving system is the observed behaviors for mass ratios larger than $10^{-4}$ but smaller than 0.005. In this regime, there remains energy in the grounded housing element after the time $t=\Omega^{-1}=8$, with the remaining energy appearing to dissipate at a rate that is faster than that due to the viscous damper attached to the housing element. Reference is made to the mass ratio regime between $10^{-4}$, say, and 0.005, as the "effective dissipation" regime. The explanation for this regime is the removal of energy from the internal oscillators impacts the motions at the connections of the internal springs and the mass element, thereby extending the time of action of the net internal force pulse. The effect represents an additional "physics," in coupling the effects of removing mechanical energy as electricity and the transfer of energy from the mass element to the internal oscillators. This additional physics, while of secondary importance to that which applies for the case of optimum energy transfer, can be exploited in relaxing somewhat the strict requirement on the total mass of the internal oscillators as a ratio of the housing element mass.

Lessons from the Numerical Simulations that Apply to the Invention

The lessons that are based on the numerical simulations are summarized as follows.

1. The conclusion of the theoretical analysis that for a broad range of experiment scenarios, that a percentage of kinetic energy introduced to the housing element of a MMM by the action of an impulsive force is transferred to the internal oscillators over a time measured in units of $\Omega^{-1}$, where it remains trapped for a time measured in units of is validated.
2. The possibility of a MMM design, which results in virtually all of the kinetic energy introduced to the housing element transferred to the internal oscillators is demonstrated.
3. The primary design parameters for this transfer to obtain are the ratio of the total mass of the internal oscillators to that of the housing element, and the fractional width of the band spanned by the resonances of the internal oscillators, $\Omega/\omega_c$.
4. For a fractional bandwidth equaling ⅛, the optimum total mass of the internal oscillators relative to mass of the housing element is approximately, 0.005, a ratio that is surprising small.
5. Removing mechanical energy from the grounded MMM at the level of the internal oscillators, by converting it to an electrical current, has no effect on the time for inputting mechanical energy to the housing element and only minor effect on the transfer time of energy from housing element to the internal oscillators. The internal conversion of energy to electrical currents, the sum of which is outputted via the housing element, changes the nature of the device, now a MMMEEC.

6. Removing mechanical energy from the grounded MMMEEC at the level of the internal oscillators, can have a beneficial effect in broadening the range of values of the primary design parameters for which virtually all energy inputted to the housing element is transferred to the internal oscillators. Exploiting this potentially beneficial effect can result in an slight increase in the time required to transfer energy to the internal oscillators.

The Energetics of a MMVEH

For a MMMEEC to operate as a MMVEH, it must be attached to a VS, which both determines the mechanical energy inputted to the housing element, drawn from the broadly distributed vibration field contained in the VS, and, figures prominently in determining the motion history of the housing element in response to the inputted energy. The ultra-broad range of harvesting scenarios precludes a definitive description of the design of an effective MMMVEH for the all scenarios. This said, one can distinguish between two broad classes, or regimens, of harvesting scenarios, one termed "resonant," and one termed "non-resonant," with the remaining harvesting scenarios understood as intermediate these two regimes, as extremes. For the "resonant" harvesting regime, the VS response is "global," in the sense that global physical measures defined on the entirety of the VS determines its behavior at the attachment location. For the "non resonant" harvesting regime, the VS response is "local," in the sense that the behavior of the VS at the attachment location is determined by physical measures that are local to the attachment.

The simply-supported beam[30] shown in FIG. 7 with a MMVEH[31] directly attached at a location along its length can illustrate both scenarios, each distinguished by the description of the beam forcing, the source of the vibration field contained therein.

The Resonant Harvesting Regime

A necessary condition for a harvesting scenario to be resonant, in the sense indicated, is for the external forcing of the VS to act "coherently" for a sufficient time to engage the entire structure in determining its behavior across the local region at which a MMVEH is attached. It is well known to practitioners with knowledge of vibration theory that prediction models for VS that respond globally are conveniently formulated in terms of the normal "modes" of the VS. The modes are global response measures, which can be "synthesized" to form a representation of any VS response measure, including its local behavior at the attachment region. As an illustration, FIG. 8 shows the lowest vibration mode shape[32] for the simply supported beam.

Figure 9:
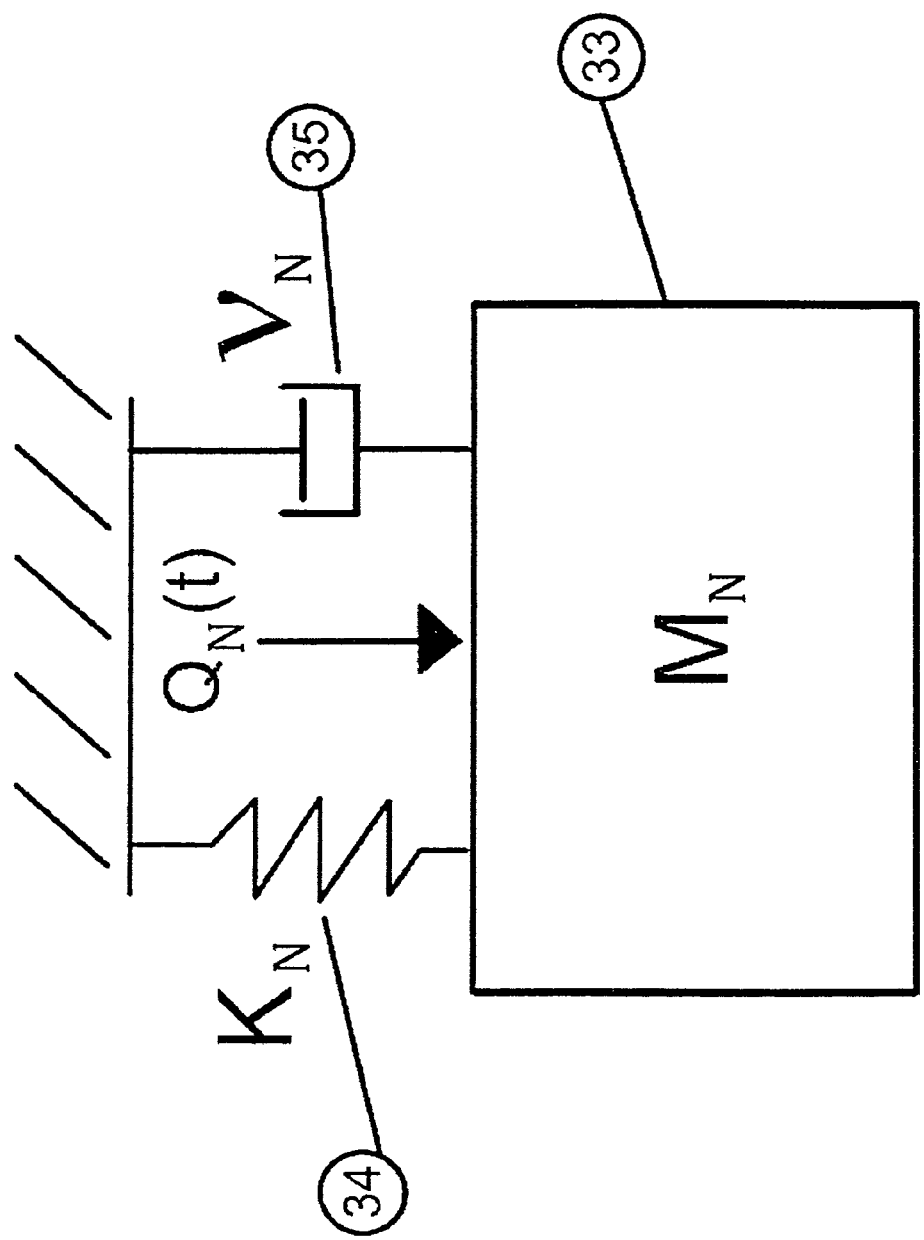
FIG. 9 shows a graphical representation of a mathematical model for predicting the n-th modal amplitude history for a resonant vibrating structure (RVS)

Each mode represents a separate degree-of-freedom, with each modal "coordinate" evolving independently of the others, when there is no attached MMVEH. Thus, the temporal history of each modal coordinate is governed by a mathematical model represented by a grounded mass, illustrated in FIG. 9. The integer, n, identifies a particular mode; $M_n$, the modal "mass,"[33] is a global measure of the density distribution throughout the VS; $K_n$, the modal "stiffness,"[34] is related to a resonant frequency of the VS, $w_n = \sqrt{K_n/M_n}$; and, the dashpot measure[35] $k_n$ quantities the rate at which energy is irreversibly lost to the mode. The modal force $Q_n(t)$ is a "projection" of the external forcing F(t) that is the source of vibration energy in the VS.

Figure 10:
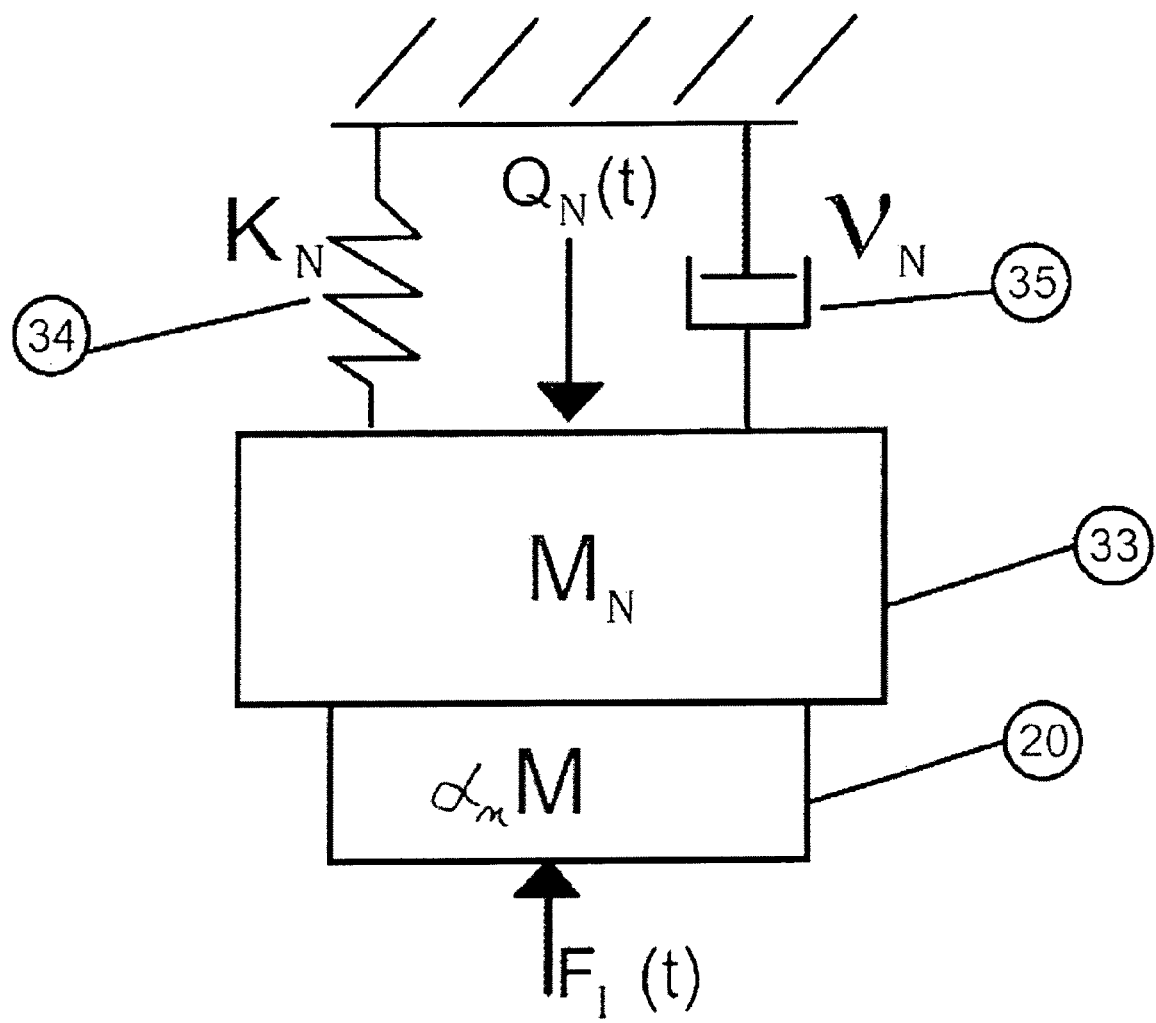
FIG. 10 shows a graphical representation of a mathematical model for predicting the n-th modal amplitude history of the RVS model represented by FIG. 9 when a single MMVEH is directly attached at some location across the RVS.

Attaching a MMVEH to the VS couples the modes, as it transfers energy between the VS and the MMVEH; this greatly complicates the response prediction problem, in general. If, however, one chooses the frequency band of the internal oscillators to straddle one of the resonant frequencies, $\omega_n$, and accepts that $\Omega$, the width of the band of internal oscillators, is substantially narrow, measured relative to the frequency difference separating resonances, the coupling of the modal coordinates can be ignored, to lowest order. The type of attachment of the MMVEH to the VS affects the behaviors of both the MMVEH and the VS. For specificity, one can assume the housing element is directly attached to a surface of the VS; a brief section describing other attachments is provided below. For the directly attached MMVEH, then, the mathematical model for estimating the housing element motion history is illustrated in FIG. 10, which can be identified with FIG. 5, by replacing the mass $M_s$ in FIG. 5 with the sum of a factor, $\alpha_n$, times the housing element mass M and the modal mass, $M_n$, i.e., $(\alpha_n M + M_n)$, where the factor $\alpha_n$ depends on the MMVEH attachment location, and the mode. The selection rule in the second sentence of this paragraph determines a specific mode, determining a specific $\alpha_n$, denoted by a and a specific $M_n$, denoted by $M_h$. Also distinguishing the two figures is the absence of the attached oscillators in FIG. 10 with these represented by the net internal force $F_I(t)$ that the oscillators cause to act on the housing element in response to $Q_n(t)$. The conclusions demonstrated, both analytically and by numerical simulations, for the grounded MMM are applicable for the MMVEH operating in the resonant harvesting regime.

Figure 11:
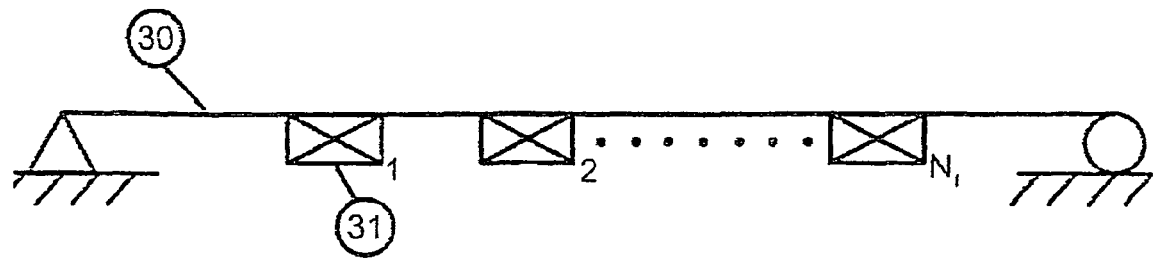
FIG. 11 shows a schematic of a simply supported beam with multiple MMVEH's attached.
Figure 12:
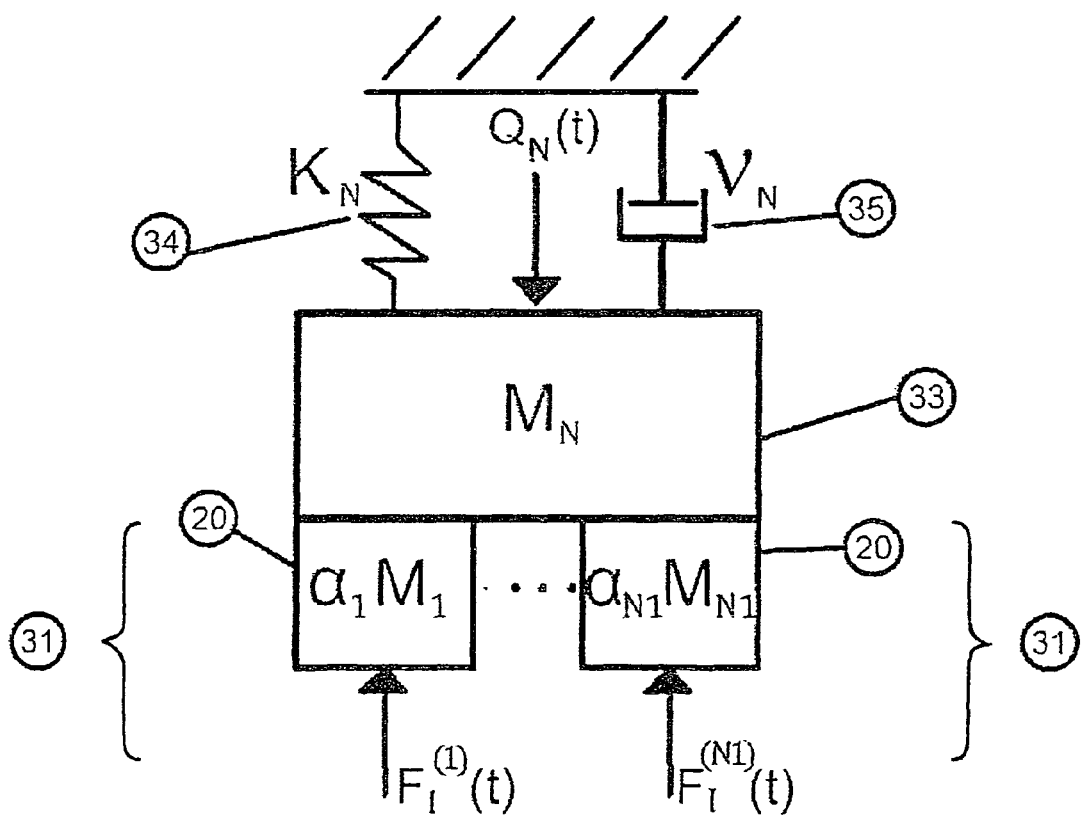
FIG. 12 shows a graphical representation of a mathematical model for predicting the n-th model amplitude history for the RVS model represented by FIG. 9 when multiple MMVEH's are directly attached at locations across the RVS.

An observation, readily demonstrated for the simply supported beam illustration of FIG. 7 and valid in general, is the modal mass approximately equals the total mass of the VS, a mass that for a large VS can be too large for a practical device; 1% of a large mass can, for practical reasons, be too large. A second observation, again readily demonstrated for the illustrative simply supported beam and valid in general, can be exploited to mitigate this practical problem. The observation is that each modal coordinate represents a "component" vibration field that is spatially coherent over the extent of the VS. This perfect spatial coherence together with the high temporal coherence of the component vibration field allows the use of multiple MMVEH[31] distributed over the extent of the VS, e.g., along the length of the simply supported beam as illustrated in FIG. 11, all of which will act in unison. The mathematical model governing the behavior of this dynamical system is illustrated in FIG. 12, a reproduction of FIG. 10, now with a multiplicity of MMVEH[31] attached to the modal mass[33].

An implication of the MMVEH acting in unison is that 1% of the total mass can be distributed, albeit not uniformly, among the multiple MMVEH. A different implication is that for a sub optimum MMVEH, the energy not immediately transferred to the internal oscillators is returned to the VS as energy coherent not only across MMVEH but coherent with the energy in the vibration field. The invention envisions the use of multiple MMVEH for this purpose.

The Non-Resonant Harvesting Regime

Figure 13:
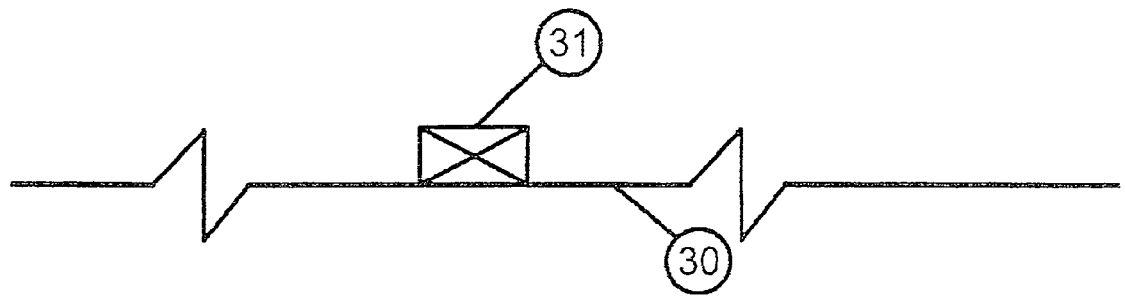
FIG. 13 shows a schematic of a region of an unboundedly long beam with a single attached MMVEH.
Figure 14:
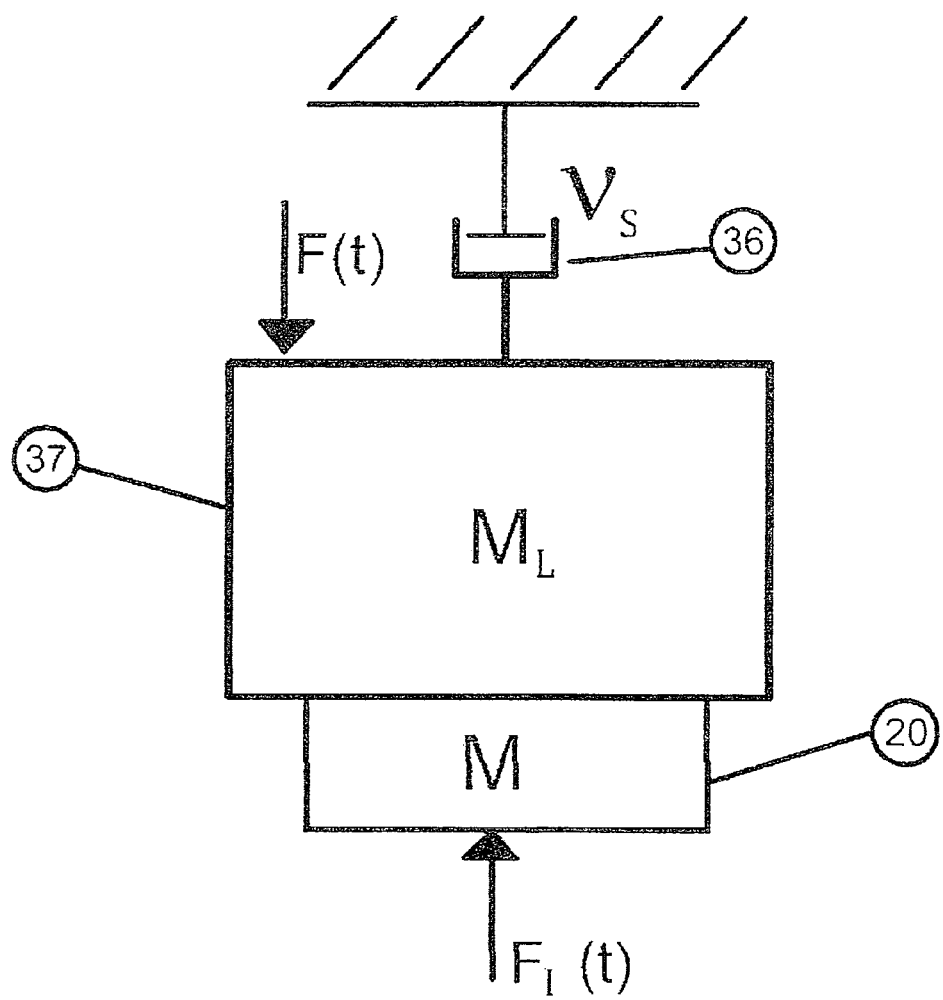
FIG. 14 shows a graphical representation of a mathematical model for predicting the velocity history of the housing element of a MMVEH directly attached to a non-resonant vibrating structure (NRVS)

The non-resonant harvesting regime includes scenarios for which the external forcing of the VS is spatially local and acts for a time that is short when compared to the travel time of an acoustic disturbance across the VS. It also includes spatially and temporally extended forcings for which the spatial/temporal coherence is substantially short. For non-resonant harvesting scenarios, the interaction of VS and a MMVEH, which is local in space, is also local in time. Consequently, the passive effects of the VS in determining the motion history of the housing element are as though the VS were unbounded in at least one dimension. Assuming the MMVEH[33] attached to the simply supported beam illustrated in FIG. 11 is located at a sufficient distance from the end supports, the passive effects of the beam in determining the behavior of the MMVEH[31] would be as though the beam[30] is unbounded in both directions, illustrated in FIG. 13. In "resisting" the motion of the housing element of the MMVEH, then, the beam, as representative of a generic VS, acts to remove mechanical energy, irreversibly. An appropriate mathematical model governing the motion of the MMVEH housing element[20] is illustrated in FIG. 14, wherein the grounding dashpot[36] represents the action of the beam in resisting the motion of a combination of the housing element mass[20] M and the appropriate local mass[37] of the VS, denoted by $M_L$.

Figure 15A:
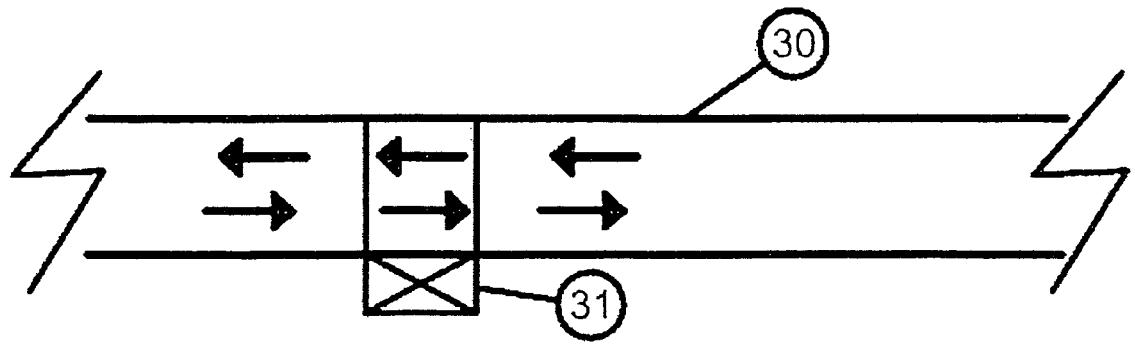
FIGS. 15A, 15B and 15C show 3 schematics of the energy flows in a NRVS in the neighborhood of a directly attached MMVEH, according to too-light; too-heavy; and ideal MMVEH, respectively.
Figure 15B:
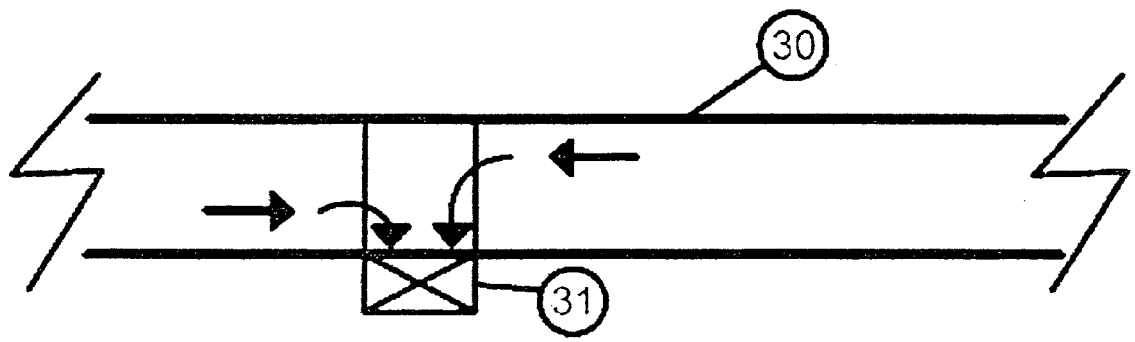
Figure 15C:
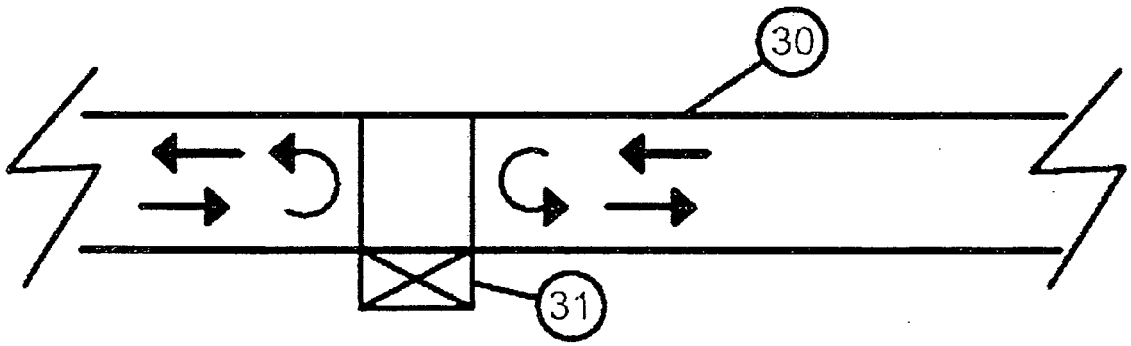

The relative magnitudes of the total mass of the MMVEH, $M+\Sigma_j m_j$, to $M_L$ is a critical factor in determining the transport of energy in the VS, in the neighborhood of the MMVEH. For a MMVEH mass that is too light relative to $M_L$, the magnitude of the internal force that the MMVEH exerts at its attachment to the VS is too small to accomplish much work. Consequently, little energy is transferred from the VS to the MMVEH. Referring to the energy transport in the VS, the fact that little energy is transferred to the device results in little impact on the transport in the neighborhood of the VS, near the MMVEH. This situation is illustrated in the uppermost of FIG. 15, in which the energy transport near a MMVEH directly attached to a beam-like[30] VS is represented by arrows. As illustrated in the uppermost of the figures, a too-light MMVEH has little impact on the energy transport past the devices, in either direction. This case applies for a MEMS, VEH. At the other extreme of a MMVEH that is too heavy relative to $M_L$, the device acts to impose a geometric, workless, constraint for which, once again, little energy transfer to the MMVEH. Referring to the energy transport in the VS, the imposition of a geometric constraint results in a reversal in the directions of the energy transport at the boundaries of the neighborhood of the directly attached MMVEH. This case is illustrated in the bottommost of FIG. 15 in which the arrows representing the energy transport are shown reflected at the boundaries VS. Little energy is transferred, and harvested, because the MMVEH changes the energy transport in the VS resulting in little energy its immediate neighborhood. For a scenario for which the MMVEH mass is neither too light nor too heavy, compared to $M_L$, substantial energy transfer to and into the MMVEH via the housing element obtains. If by design, the energy transfer to the housing element is subsequently transferred to the internal oscillators rapidly enough to preclude an immediate return transfer, instead accumulating in the oscillators until being converted to electricity, virtually complete harvesting obtains. This of the MMVEH is transferred to the internal oscillators, for harvesting, no reverse transfer of energy to the VS will obtain. This case is illustrated in the middle figure of FIG. 15. The invention is a MMVEHH that seeks to exploit this Goldilocks range.

Attaching the MMVEH to the VS

Figure 16A:
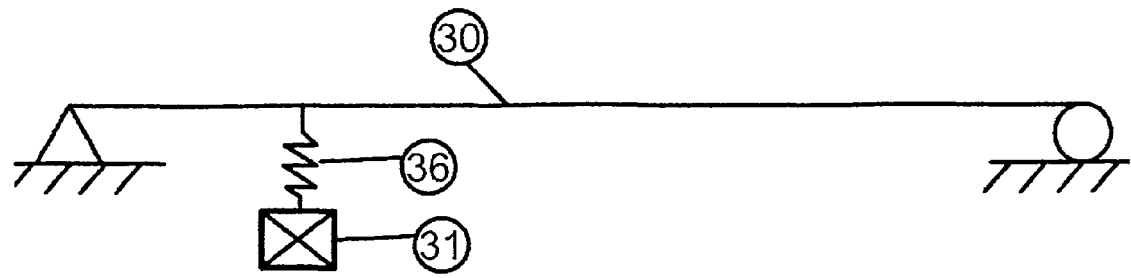
FIGS. 16A and 16B show schematics of a MMVEH attached to a beam-like VS via an elastic element.
Figure 16B:
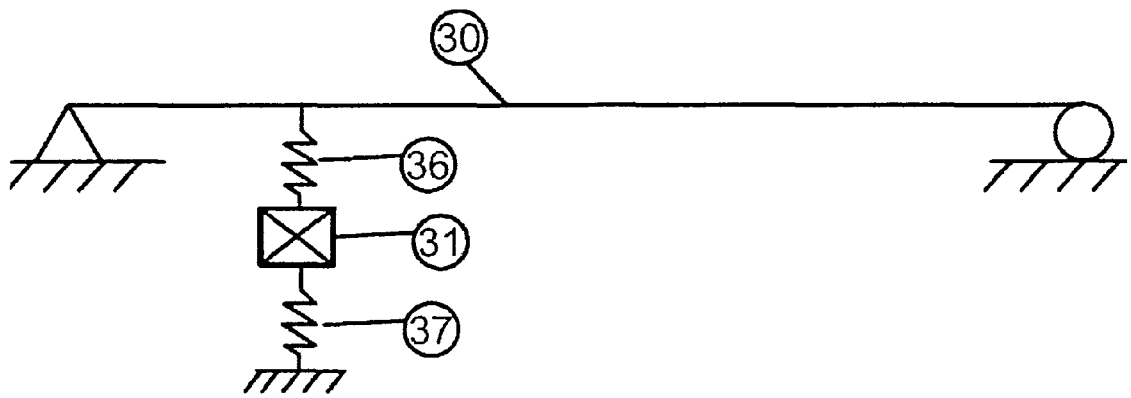
Figure 17:
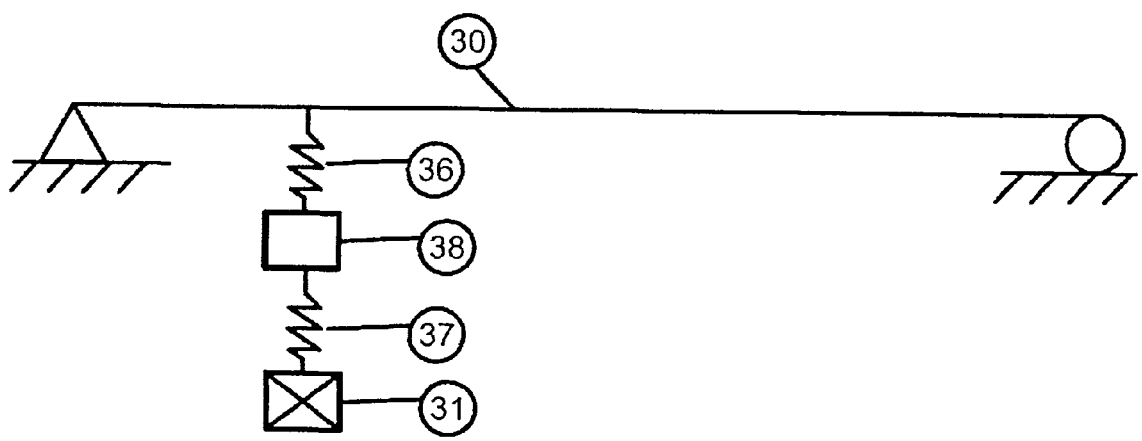
FIG. 17 shows a schematic of attaching a MMVEH, as part of a dynamical system, to a beam-like VS.

The manner of attaching the MMVEH to the VS is an issue for effective vibration harvesting. For the harvesting scenarios used to illustrate the workings of the invention, only direct attachments were illustrated. The invention contemplates any manner of attachment. Illustrated in FIGS. 16A and 16B are cases in which a single MMVEH[31] is attached to a simply supported beam 30 using a spring[35]; linear, nonlinear and non-elastic springs are contemplated. In FIG. 16A, the only grounding of the MMVEH[31] is through the VS; in FIG. 16B, the MMVEH[31] is also directly grounded using a second spring[37]. A further case is illustrated in FIG. 17, in which the MMVEH is part of a two degree-of-freedom dynamical system, represented by connecting the MMVEH[31] to a mass element[38] using a spring[36] and connecting this mass element to the simply supported beam using a second spring[37].

Figure 18:
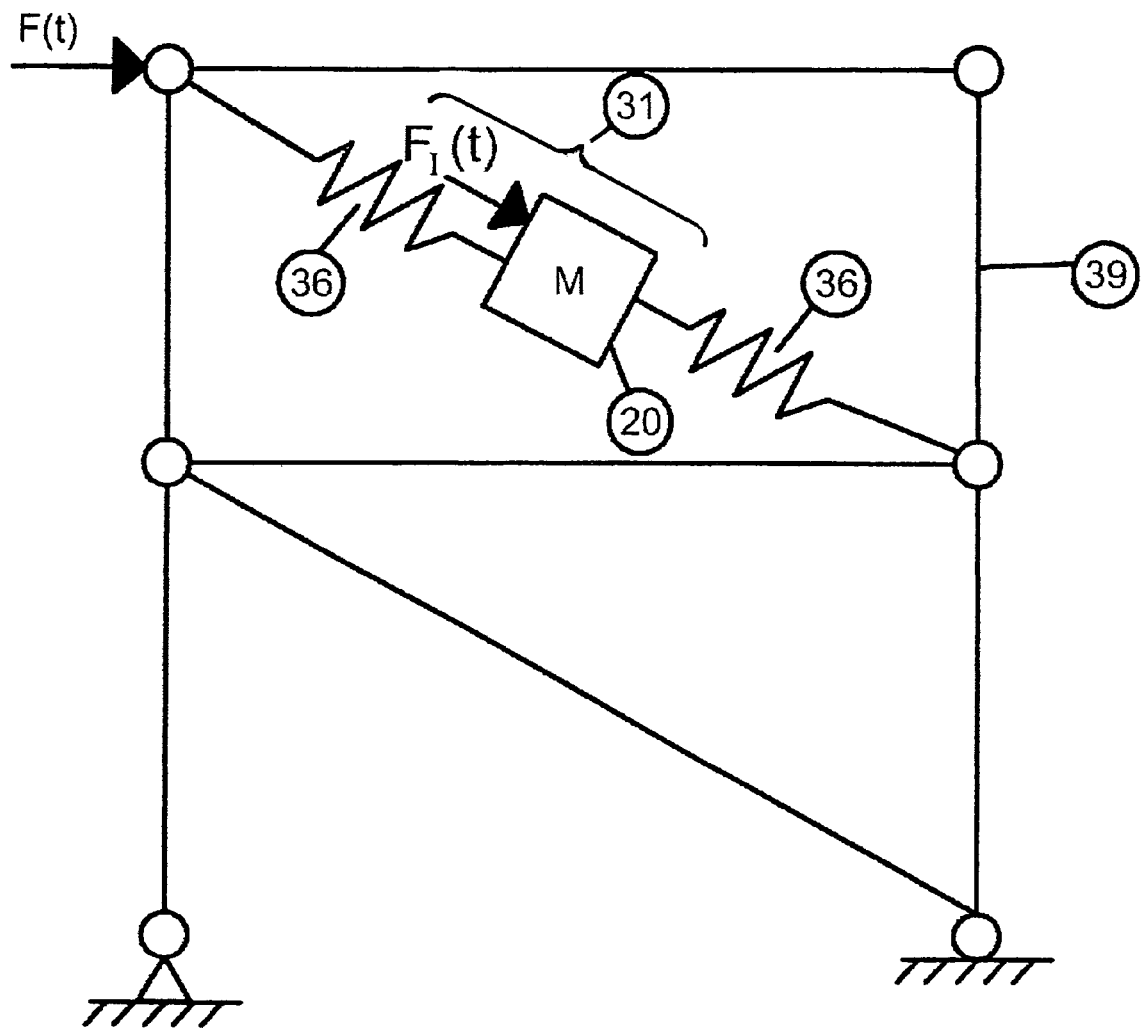
FIG. 18 shows a schematic of attaching a MMVEH to two locations of a structural frame, using elastic elements.

For VS that are more geometrically complicated than a beam element, more geometrically complicated types of attachment are contemplated. As illustration, FIG. 18 shows a structural frame[39] as VS, to which a MMVEH[31] are attached at two locations by spring elements[36].

Deformable MMMEEC's and MMVEH's

Figure 19:
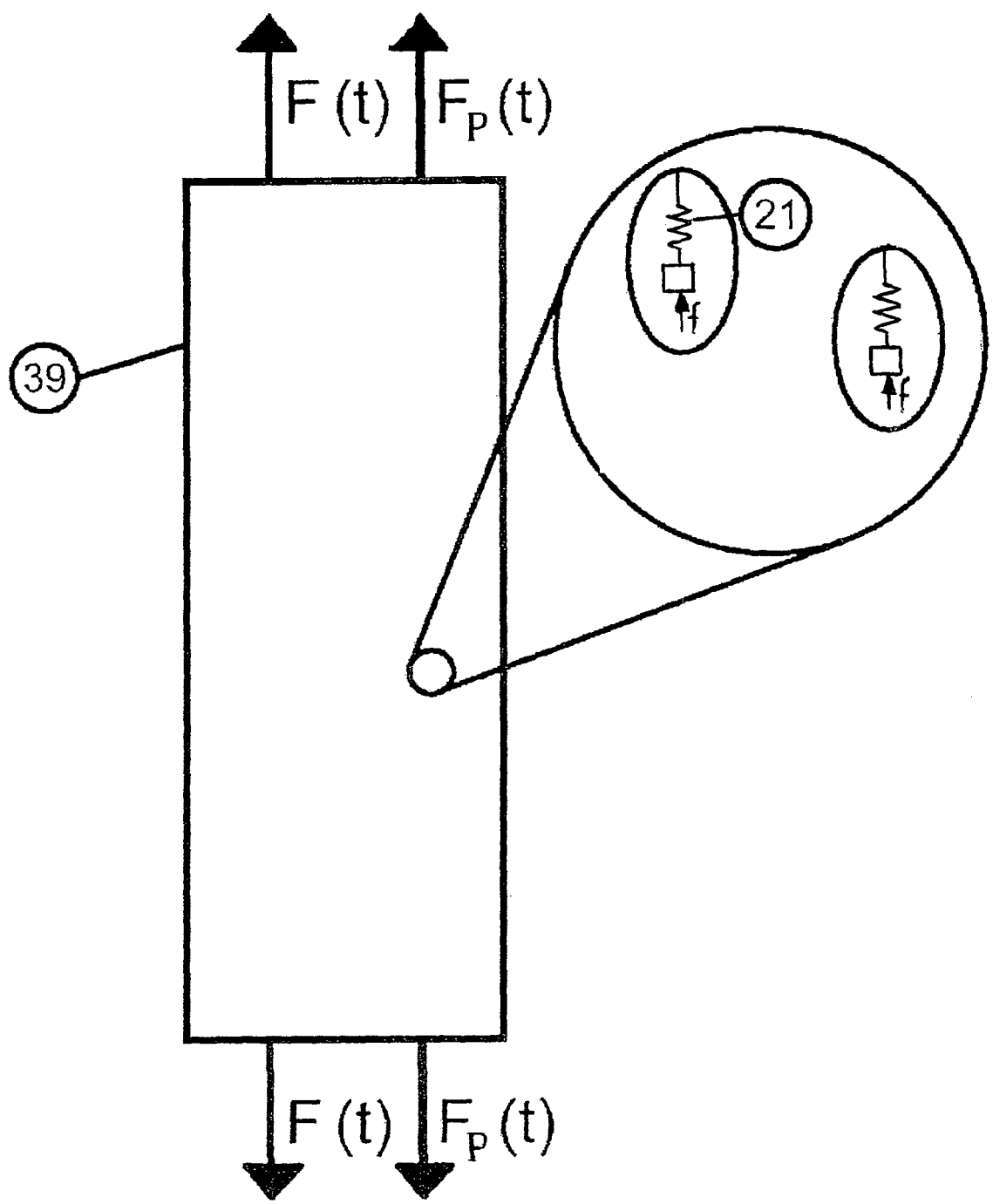
FIG. 19 shows a schematic of a deformable meta-material mechanical/electrical energy converter, for which the housing element is a rod.

For the manifestations of the MMVEH presented above as illustrative, the housing element is rigid. The invention contemplates other manifestations for which the meta-material devices are deformable. In this regard, three deformable meta-material devices are easily envisioned; those for which the housing elements are rods; beams; and, plates. FIG. 19 is a schematic showing a rod[39] encapsulating internal oscillators represented by sprung masses[21] and energy converter elements represented by force acting on the internal masses. The effects of an external environmental, the VS and the vibration field contained therein, on the meta-rod device are represented the time-vary forces, F(t) and Fp(t), acting on the end sections of the rod. FIG. 21 is a schematic showing both a beam[42] and a plate[43], encapsulating internal oscillators represented by sprung masses[21] and energy converter elements represented by forces acting on the internal masses. For a plate, FIG. 21 shows only a side view. The effects of the external environment on the meta-beam (meta-plate) are time varying force distribution fields acting across the face of the meta-beam (meta-plate), a one dimensional field for the beam and a two-dimensional field for the case of a plate.

As a prelude to describing the energetics of deformable meta-materials and the design of deformable MMMEEC and MMVEH, it is convenient to compare and contrast a meta-material with a composite material, where the latter can be described as a manmade material mixtures comprising a large number of mini-sized inclusion of one material distributed in a matrix of a second material. A fiber-reinforced plastic is an example of a composite material. Using this, a meta-material can be said to be a composite material for which the inclusion are, in the context of the invention, oscillators joined with energy converter elements. This understanding is convenient since the behavior of a deformable meta-material has certain aspects in common with a deformable composite, and other aspects that are unique to a meta-material. The unique aspects, again in the context of the invention, are the enhanced energetics occasioned by the capacity of the internal oscillators to resonate and thereby can store and accumulate substantial amounts of energy.

The effects of distributing inclusions in a rigid matrix is limited to changing its mass density; the effects of distributing oscillators in a rigid housing element are such as to suggest the invention of a MMVEH. The highly technical detailed description of the invention is occasioned by the absence of a simple, reasonably complete theory for predicting the behaviors of rigid MMVEH attached to the broad range of VS for which the invention is applicable. The absence of an encompassing theory necessitated the use of illustrative experimental scenarios to demonstrate the enhanced energetics that is the bases of the invention. The absence of an encompassing theory also necessitated the division of harvesting scenarios, in limited classes for which greatly simplified prediction models could be formulated, thereby demonstrating the invention could be reduced to practice.

The simplified prediction models are expected to have a further role in accomplishing specific MMVEH designs, once the geometry and compositions of a VS and the vibration field contained therein are specified. The role is to guide the design, perhaps to accomplish a preliminary design. It is further expected, however, that completing a specific design for the broad range of VS and vibration fields for which the invention is intended will require numerical simulation, using sophisticated finite element computer software.

The effects of distributing inclusions in a deformable matrix are significant, the recognition of which was the occasion of the formulation of an encompassing theory for predicting the behaviors of composite materials. Effective modulus theories for predicting the large-length-scale behaviors of composite material rods, plates, and beams allow the easy incorporation of these as elements of VS. An encompassing theory for predicting the behaviors of meta-material is not available. One might speculate on the possibility that a suitably encompassing theory will be accomplished with further mathematical research. Absent an encompassing theory necessitates a greater reliance on numerical simulation. This absence is not germane, however, to the claim of an invention of a device comprising a deformable meta-material, provided it is clear that the invention is useful and can be reduced to practice.

The consequences of the housing element deformability on the energetics of a MMMEEC, and hence a MMVEH, is an issue. As for a device for which the housing element is rigid, the energetics can be described in phases, the first phase being the inputting of mechanical energy to the housing element of the device. For a rigid housing element, the energy inputted is in the form of kinetic energy and, assuming for grounding of the housing element is energy conserving, obtains "instantly." By contrast, for a housing element that is deformable, the energy inputted to the housing element is in the form of large-length-scale vibrations and obtains, even for a grounding of the housing element that is energy conserving, over time. Assuming the time for inputting the energy is rapid enough, as to be completed before significant motion of the internal oscillators obtains, the effects of the internal oscillators on this phase of the energetics are the same as for a composite material. The conclusion is that while the internal oscillators do effect the inputting of energy into the large-length-scale vibrations of the housing element, the effect is properly modeled as an effective change in the material of which the housing is comprised.

The second phase of the energetics is the transfer of the energy from the housing element to the internal oscillators. For the device for which the housing element is rigid, the energy transfer obtains from the housing element as an entity to the totality of internal oscillators. For the device for which the housing element is deformable, the inputted energy is distributed non-uniformly across the housing element. The energy transfer to the internal oscillators can be expected to reflect this non-uniformity, with the transfer incorporating a localness such that the energy in local regions is transferred to internal oscillators located in the corresponding local regions. To the extent that the localness is as complete as suggested by the above sentence, this second stage energy transfer is easily quantified. The quantification differs from that for the rigid housing element only in replacing the housing element mass with a housing element mass density, and the sum of the internal oscillator masses with a local sum of the internal oscillator masses. The description of the energy transfer would be the same as for the rigid housing, provided the non-uniformity in the inputted energy distribution does not require for its resolution in local regions, regions that are so small that the number of internal oscillators contained therein is too small. It is intuitive that there are cases for which the energetics is as described. There is little doubt that the behavior of the invention will be as claimed, the closer one is to the cases for which the energetics is as described.

The absence of an encompassing theory for predicting the behavior of meta-material device with a deformable housing element does not preclude constructing a simplified model for special cases, the deformable rod meta-material schematically illustrated in FIG. 19. This case is simple because the interaction of the device with the external environment is limited to equal and opposite forces acting at the end sections. The deformable rod is itself a structural element that is resonant in the sense described previously. This suggests the model illustrated in FIG. 20 as governing the "change in the length" of the rod. The mass[40] in FIG. 20 has a value of the order of the total mass of the rod, denoted by $M_r$, which is grounded by a spring[41] with a stiffness, denoted by $K_r$, that equals $M_r w2/_n$, where wn is a resonant frequency of an effective rod. For definiteness, $w_0$ can be identified with the smallest, non-zero, resonant frequency of the rod with the ends free to move. The illustration requires further description. The displacement of the mass element in the figure measures not a physical displacement but a modal coordinate, which represents a deformation mode. For $w_0$ representing the lowest, non-zero resonant frequency for rod with the ends free to move, the deformation mode shape, expressed in the deflections of all section of the rod, has no motion at the rod center section with maximum motions at the end sections. As already indicated the displacement of the mass element in the figure also measures the change in length of the end sections.

Figure 20:
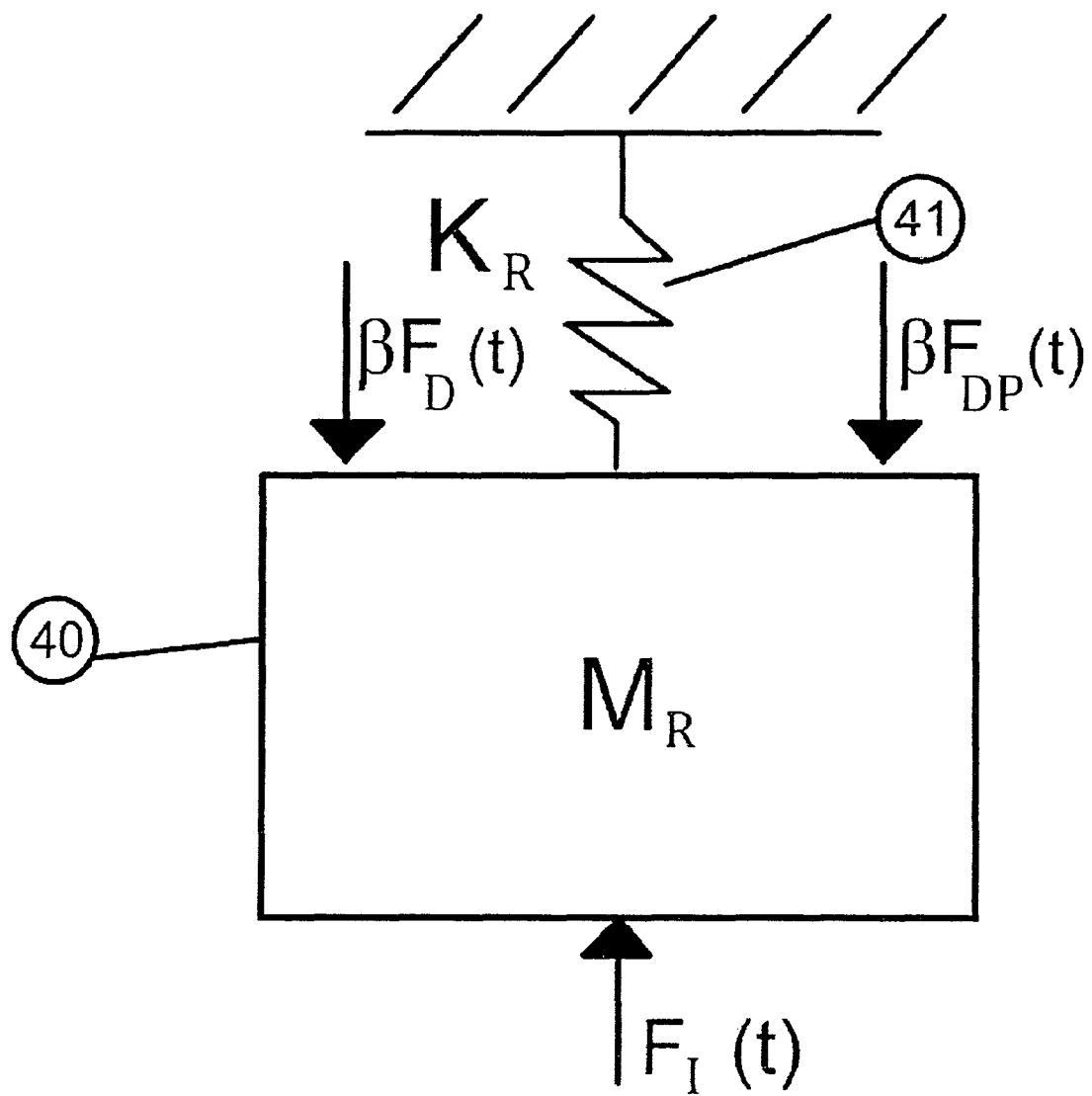
FIG. 20 shows a generic mathematical model governing the change in length of the housing element rod illustrated in FIG. 19.

The energetics for device illustrated in FIG. 19, for which the mathematical model in FIG. 20 applies, can be investigated for a scenario in which there is no element grounding the rod. For this case, the spring shown grounding the mass element represents the stiffness of the rod element to deformation. One can compare the mathematical model represented by FIG. 20 when Fp is set to zero, and the mathematical model represented by FIG. 5 when the attached oscillators shown therein is replaced by a net internal force the oscillators cause to act on the housing element. The two mathematical models are identical, even though the physical variables represented are different. That the two mathematical models are identical implies the energetics of the two physical systems represented is identical. This further implies the simulated results shown in FIG. 6, including the complete transfer of energy from the base mass (or deformable housing element) for the force F(t) is rapidly and completely transferred to the internal oscillators to be dissipated by internal dampers (or converted to electricity) is identical. The physical manifestations of the two systems, which include the distribution of the internal oscillators across the length of the deformable rod, are different; the energetics of the two systems is identical.

Constructing a model for the behavior of a meta-material for which the housing element is a beam, or plate, and which interacts with the external environment by a force field acting across the face of the rod, or plate, would be vastly more complicated. Faced with this task, one would best turn to numerical simulation.

Converting Mechanical Energy to an Electric Current

The description of the invention accepts, and makes claims for, any manner of converting mechanical energy to an electric current at the level of the internal oscillators. The genesis of one claim made for the invention is the possibility of an MMVEH design that explicitly incorporates a nonlinear attachment to a VS, which results is a transfer of energy across frequency to accompany the transfer of energy from the VS to the MMVEH. The genesis of another claim for the invention is the accumulation, in time, of the mechanical energy transferred to the internal oscillators. This allows the design of a nonlinear mechanical/electrical energy converter, one that allows the mechanical energy to accumulate to a design level, before rapidly converting it to an electric current pulse.

The invention claimed is:

1. A meta-mass mechanical/electrical energy converter MMMEEC for converting mechanical energy to an electrical current, comprising a rigid housing element having a mass M adapted for communication with an external mechanical energy source, the housing element comprising a base system having a resonance equal to $\omega_0$ when grounded, the housing element encapsulating N oscillators each being of substantially equal mass that sum to $m_s$ and having resonances that are substantially uniformly distributed across a band of width $\Omega$ centered at $\omega_c$, each oscillator causing a time varying internal force to act on the housing element in response to mechanical energy transferred from the external energy source, the sum of the internal forces determining a net internal force NIF that quantifies the internal transfer of energy between the housing element and the encapsulated oscillators, the NIF having a history that is determined as a convolution of a history of an external force that represents the external mechanical energy source and a time series that has the form of a sequence of pulses, each pulse having a width approximately equal to $\Omega^{-1}$ and each separated from its neighbors by an interval approximately equal to $N\Omega^{-1}$, so that the pulses appear well separated when measured in units of $\Omega^{-1}$ for N substantially larger than 1, the first of such pulses causing a transfer of some portion of mechanical energy entering the MMMEEC via the housing element during the action time of said first pulse, from said housing element to the encapsulated oscillators, while the time interval between the first and a second pulse assures the energy arriving in the encapsulated oscillators remains trapped therein, said portion of energy entering the housing element being transferred to the encapsulated oscillators being determined by the value of a mass ratio $m_s/M$, such that for a determinable value substantially all of the energy entering the housing element is transferred to the encapsulated oscillators, wherein the energy remains trapped, the MMMEEC therefore acting as a "one-way mechanical energy valve" such that energy transfers into but not out-from the MMMEEC via the housing element, and the MMMEEC acting as a "mechanical battery" such that the energy arriving in the encapsulated oscillators accumulates, the value of $m_s/M$ that assures substantially all of the energy arriving in the housing element being transferred to the encapsulated oscillators, which depends on $\Omega/\omega_c$, $\omega_0/\omega_c$ and N, being determined by numerical simulations, each oscillator being combined with a converter element for converting mechanical to electrical energy, such that the converter elements await the accumulation of mechanical energy arriving in each of the oscillator/converter elements before converting the mechanical energy to an electrical current, and electrical circuitry for collecting and combining each of the electrical currents and outputting the sum of the currents via the housing element.

2. The MMMEEC according to claim 1, wherefore N approximately equals 50, $\Omega/\omega_c$ approximately equals 0.1, and $\omega_0/\omega_c$ approximately equals 1.0, such that the value of $m_s/M$, which assures substantially all the energy arriving in the housing element is transferred to the oscillators, as determined by numerical simulation approximately equals 0.01.

3. A meta-mass vibration energy harvester MMVEH for harvesting mechanical energy from a vibrating structure VS, defined mathematically by a measure of inertia $M_h$ and a measure of resistance to deformation, the measure of resistance having both an elastic component and a dissipative component, the structure containing vibrations with a given degree of coherence, the MMVEH comprising a rigid housing element of mass connected to at least one local region of the VS, the housing element plus the structure comprising a base system having a resonance equal to $\omega_0$, the housing element encapsulating $N$ oscillators, the oscillators being of substantially equal mass that sum to $m_s$ and having resonances that are substantially uniformly distributed across a band of width $\Omega$ centered at $\omega_c$, each oscillator causing a time varying internal force to act on the housing element in response to mechanical energy transferred from the VS, the sum of the internal forces determining a net internal force NIF that quantifies the internal transfer of energy between the housing element and the encapsulated oscillators, the NIF having a history that is determined as a convolution of a history of an external force that represents the VS as an external mechanical energy source and a time series that has the form of a sequence of pulses, each pulse having a width approximately equal to $\Omega^{-1}$ and each separated from its neighbors by an interval approximately equal to $N\Omega^{-1}$, so that the pulses appear well separated when measured in units of $\Omega^{-1}$ for N substantially larger than 1, the first of such pulses causing a transfer of some portion of mechanical energy entering the MMMEEC via the housing element during the action time of said first pulse, from said housing element to the encapsulated oscillators, while the time interval between the first and a second pulse assures the energy arriving in the encapsulated oscillators remains trapped therein, said portion of energy entering the housing element being transferred to the encapsulated oscillators being determined by the value of a mass ratio $m_s/(\alpha M+M_h)$, $\alpha$ being a determinable geometric parameter that depends on the location of the MMVEH, such that for a determinable value said mass ratio substantially all of the energy entering the housing element is transferred to the encapsulated oscillators, wherein the energy remains trapped, the MMVEH therefore acting as a "one-way mechanical energy valve" such that energy transfers into but not out-from the MMVEH via the housing element, and the MMVEH acting as a "mechanical battery" such that the energy arriving in the encapsulated oscillators accumulates while awaiting conversion to electricity, the value of $m_s/(\alpha M+M_h)$ that assures substantially all of the energy arriving in the housing element being transferred to the encapsulated oscillators, which depends on $\alpha$, $\Omega/\omega_c$, $\omega_0/\omega_c$ and N, being determined by numerical simulations, each oscillator being combined with a converter element for converting mechanical to electrical energy, such that the converter elements await the accumulation of mechanical energy arriving in each of the oscillator/converter elements before converting the mechanical energy to an electrical current, and electrical circuitry for collecting and combining each of the electrical currents and outputting the sum of the currents via the housing element.

4. The meta-mass vibration energy harvester MMVEH according to claim 3, for harvesting mechanical energy from a vibrating structure, wherein the structure comprises a non-resonant vibrating structure NRVS containing vibrations with the degree of coherence approaching incoherence, wherein the geometric parameter a approximately equals 1 for all MMVEH locations and the measure of inertia $M_h$ defining the structure comprises the mass of a local region of the NRVS and the dissipative component of the resistance to deformation is substantially larger than the elastic component.

5. The meta-mass vibration energy harvester MMVEH according to claim 3, for harvesting mechanical energy from a vibrating structure, wherein the structure comprises a resonant vibrating structure RVS containing vibrations with a degree of coherence approaching perfect coherence, and wherein the measure of inertia defining the structure $M_h$ comprises the total mass of the structure, and the elastic component of the resistance to deformation is substantially larger than the dissipative component.

6. The MMVEH according to claim 5, wherein N approximately equals 50, $\alpha$ approximately equals 1, $\Omega/\omega_c$ approximately equals 0.1, and $\omega_0/\omega_c$ approximately equals 1.0, such that the value of $m_s/(\alpha M+M_h)$ as determined by numerical simulation approximately equals 0.01.

7. The MMVEH system for harvesting mechanical energy from the RVS, comprising a multiplicity of MMVEHs each according to claim 5, each harvester being joined at a location of the RVS, such that the distribution of the multiplicity across the entirety of the RVS is optimized using numerical simulation and further wherein the combined sum of the internal oscillator masses of each of said MMVEH has a given value as large as practical subject to the restriction that the value is less than the percentage of the total mass of the RVS, determined according to claim 5.

* * * * *